(12) United States Patent
Westhoff et al.

(10) Patent No.: US 11,685,455 B2
(45) Date of Patent: Jun. 27, 2023

(54) TOOLING SYSTEM AND METHOD FOR INSTALLING HYBRID MODULE WITH CLUTCH AND TORQUE CONVERTOR INTO TRANSMISSION ASSEMBLY

(71) Applicant: Ford Global Technologies, LLC, Dearborn, MI (US)

(72) Inventors: Zachary Alan Westhoff, Pinckney, MI (US); Brandon Paul Wilson, Allen Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 17/173,747

(22) Filed: Feb. 11, 2021

(65) Prior Publication Data

US 2022/0250698 A1 Aug. 11, 2022

(51) Int. Cl.
| | |
|---|---|
| *B62D 65/10* | (2006.01) |
| *B25J 9/16* | (2006.01) |
| *B25J 11/00* | (2006.01) |
| *B23P 19/10* | (2006.01) |
| *B23P 19/12* | (2006.01) |

(52) U.S. Cl.
CPC ............. *B62D 65/10* (2013.01); *B23P 19/10* (2013.01); *B25J 9/1687* (2013.01); *B25J 11/005* (2013.01); *B23P 19/105* (2013.01); *B23P 19/12* (2013.01); *G05B 2219/45064* (2013.01); *G05B 2219/45083* (2013.01); *Y10T 29/49902* (2015.01); *Y10T 29/49904* (2015.01); *Y10T 29/53009* (2015.01);
(Continued)

(58) Field of Classification Search
CPC ........ B62D 65/10; B23P 19/10; B23P 19/105; B23P 19/12; B23P 2700/50; B25J 9/1687; B25J 11/005; G05B 2219/45064; G05B 2219/45083; Y10T 29/53039; Y10T 29/53009; Y10T 29/53013; Y10T 29/49902; Y10T 29/49904
See application file for complete search history.

(56) References Cited

U.S. PATENT DOCUMENTS 5,974,650 A * 11/1999 Kawabata ............... B23P 19/04
29/714
10,220,831 B2 3/2019 Colavincenzo et al.

FOREIGN PATENT DOCUMENTS

| KR | 100195803 | 6/1999 |
| KR | 101231345 | 2/2013 |

* cited by examiner

*Primary Examiner* — Jermie E Cozart
(74) *Attorney, Agent, or Firm* — Burris Law, PLLC

(57) ABSTRACT

A tooling system for assembling a hybrid vehicle transmission includes a positioning device, support structure, gripper, clutch actuator, rotational actuator, and controller. The positioning device positions a hybrid module relative to a transmission housing. The gripper grips an input shaft of the hybrid module. The clutch actuator actuates the clutch of the hybrid module. The rotational actuator rotates the gripper about an assembly axis. The controller controls operation of the clutch actuator, positioning device, gripper, and rotational actuator such that an operation is performed that includes the clutch actuator actuating the clutch, the gripper gripping the input shaft of the hybrid module, the rotational actuator rotating the gripper to rotate the input shaft of the hybrid module relative to an input shaft of the transmission module, and the positioning device translating the hybrid module toward the transmission module to seat a housing of the hybrid module on the transmission housing.

20 Claims, 19 Drawing Sheets

(52) U.S. Cl.
CPC .... *Y10T 29/53013* (2015.01); *Y10T 29/53039* (2015.01)

TOOLING SYSTEM AND METHOD FOR INSTALLING HYBRID MODULE WITH CLUTCH AND TORQUE CONVERTOR INTO TRANSMISSION ASSEMBLY

FIELD

The present disclosure relates to a tooling system and method for installing a hybrid module into a transmission assembly.

BACKGROUND

The statements in this section merely provide background information related to the present disclosure and may not constitute prior art.

Some hybrid vehicles include a hybrid module that mates with a transmission assembly or module. In order to install the hybrid module to the transmission assembly, a series of gear mesh engagements may be needed during the installation sequence. In some applications, the hybrid module includes a torque converter in which the pump and turbine of the torque converter can spin freely relative to the stator absent outside force to rotationally lock the pump and/or turbine. In some such applications, it would be desirable to locate the torque converter on the hybrid module in such a position that it is moved into a housing of the transmission during installation. However, such positioning can make the torque converter inaccessible to conventional tooling. Thus, such positioning of the torque converter can make aligning the gear mesh engagements difficult, time consuming, or even impossible with conventional tooling, especially at rates required for high volume production of hybrid vehicles.

The present disclosure addresses these and other issues associated with assembling hybrid modules with torque converters into transmission assemblies.

SUMMARY

This section provides a general summary of the disclosure and is not a comprehensive disclosure of its full scope or all of its features.

In one form according to the teachings of the present disclosure, a tooling system for assembling a hybrid vehicle transmission assembly that includes a hybrid module and a transmission module, the tooling system including a positioning device, a support structure, a gripper, a clutch actuator, a rotational actuator, and a controller. The positioning device is configured to position the hybrid module relative to a transmission housing of the transmission module. The gripper is supported by the support structure and configured to grip an input shaft of the hybrid module. The clutch actuator is configured to actuate the clutch of the hybrid module. The rotational actuator is drivingly coupled to the gripper and configured to rotate the gripper about an assembly axis. The controller is in communication with the positioning device, the gripper, the clutch actuator, and the rotational actuator. The controller is configured to control operation of the clutch actuator, the positioning device, the gripper, and the rotational actuator such that an operation is performed that includes the clutch actuator actuating the clutch to engage, the gripper gripping the input shaft of the hybrid module, the rotational actuator rotating the gripper to rotate the input shaft of the hybrid module relative to an input shaft of the transmission module, and the positioning device translating the hybrid module toward the transmission module to seat a housing of the hybrid module on the transmission housing.

According to a variety of alternative forms: controller is configured to control the positioning device to align the hybrid module with the transmission housing along the assembly axis and to control a translational device to translate a housing of the hybrid module toward the transmission module; the tooling system further includes a plurality of alignment pins coupled to the support structure, each alignment pin configured to engage a mating feature on the hybrid module to align the hybrid module with the gripper; the tooling system further includes a plurality of springs configured to bias the alignment pins axially relative to the support structure toward the housing of the hybrid module; the clutch actuator is coupled to the support structure; the clutch actuator includes a first linear actuator and a nozzle coupled to the first linear actuator, the nozzle configured to sealingly engage a port in fluid communication with the clutch of the hybrid module, the first linear actuator configured to move the nozzle relative to the support structure; the nozzle includes a nose piece, a probiscis, and a second linear actuator, the nose piece being disposed about the probiscis, the second linear actuator configured to move the probiscis between an extended position and a retracted position relative to the nose piece, the probiscis configured to sealingly engage the port; the tooling system includes a rotating base supported by the support structure and rotatable relative thereto about the assembly axis, the gripper being supported by the rotating base for rotation therewith about the assembly axis, the rotational actuator being drivingly coupled to the rotating base to rotate the rotating base; the rotational actuator includes a linear actuator supported by the support structure, the linear actuator including a rod configured to translate linearly, the rod coupled to the rotating base such that linear translation of the rod rotates the rotating base; the rotational actuator includes a motor coupled to the support structure, an output of the motor being drivingly coupled to the rotating base to rotate the gripper via the rotating base; the controller is configured to operate the rotational actuator to rotate the gripper via the rotating base while the hybrid module is translated toward the transmission module until an output shaft of the hybrid module engages an input shaft of the transmission module and the housing of the hybrid module is seated on the housing of the transmission module; the tooling system further includes a force sensor configured to detect resistance to axially translation of the hybrid module toward the transmission module, wherein the controller is configured to operate the rotational actuator to rotate the input shaft of the hybrid module in response to the force sensor detecting a force exceeding a threshold force; the tooling system further comprising a grip sensor supported by the support structure and configured to detect a presence of the shaft in the gripper; and/or the positioning device includes a robotic arm.

In another form according to the teachings of the present disclosure, tooling system for assembling a hybrid vehicle transmission assembly that includes a hybrid module and a transmission module, the tooling system including a positioning device, a support structure, a gripper, a clutch actuator, a rotational actuator, a force sensor, and a controller. The positioning device is configured to position the hybrid module relative to a transmission housing of the transmission module. The gripper is supported by the support structure and configured to grip an input shaft of the hybrid module. The clutch actuator is configured to actuate the clutch of the hybrid module. The rotational actuator is drivingly coupled to the gripper and configured to rotate the gripper about an assembly axis. The force sensor is configured to detect resistance to axially translation of the hybrid module toward the transmission module. The controller is in communication with the positioning device, the gripper, the clutch actuator, the rotational actuator, and the force sensor. The controller is configured to control operation of the clutch actuator, the positioning device, the gripper, and the rotational actuator such that an operation is performed that includes the clutch actuator actuating the clutch to engage, the gripper gripping the input shaft of the hybrid module, the rotational actuator rotating the gripper to rotate the input shaft of the hybrid module relative to an input shaft of the transmission module, and the positioning device translating the hybrid module toward the transmission module to seat a housing of the hybrid module on the transmission housing. The controller is configured to operate the rotational actuator to rotate the input shaft of the hybrid module in response to the force sensor detecting a force exceeding a threshold force.

According to a variety of alternative forms: the clutch actuator includes a first linear actuator and a nozzle coupled to the first linear actuator, the nozzle configured to sealingly engage a port in fluid communication with the clutch of the hybrid module, the first linear actuator configured to move the nozzle relative to the support structure; the nozzle includes a nose piece, a probiscis, and a second linear actuator, the nose piece being disposed about the probiscis, the second linear actuator configured to move the probiscis between an extended position and a retracted position relative to the nose piece, the probiscis configured to sealingly engage the port; the tooling system includes a rotating base supported by the support structure and rotatable relative thereto about the assembly axis, the gripper being supported by the rotating base for rotation therewith about the assembly axis, the rotational actuator being drivingly coupled to the rotating base to rotate the rotating base, wherein the rotational actuator includes a linear actuator supported by the support structure, the linear actuator including a rod configured to translate linearly, the rod coupled to the rotating base such that linear translation of the rod rotates the rotating base; and/or the tooling system includes a rotating base supported by the support structure and rotatable relative thereto about the assembly axis, the gripper being supported by the rotating base for rotation therewith about the assembly axis, the rotational actuator being drivingly coupled to the rotating base to rotate the rotating base, wherein the rotational actuator includes a motor coupled to the support structure, an output of the motor being drivingly coupled to the rotating base to rotate the gripper via the rotating base.

In yet another form according to the teachings of the present disclosure, a method of assembling a hybrid vehicle transmission assembly includes providing a hybrid module of the hybrid vehicle transmission assembly, the hybrid module including a hybrid module housing, a torque converter, a motor, a clutch, and an input shaft; aligning the hybrid module coaxially with a transmission of the hybrid vehicle transmission assembly; gripping the input shaft with a gripper; actuating the clutch to lock the torque converter; and performing a seating operation including axially translating the hybrid module toward the transmission and clocking the input shaft relative to the hybrid module housing to engage a plurality of meshing engagements between the hybrid module and the transmission until the hybrid module housing seats on a transmission housing of the transmission.

According to a variety of alternative forms: translating the hybrid module toward the transmission includes positioning the torque converter within the transmission housing; translating the hybrid module toward the transmission includes positioning at least a portion of the motor within the transmission housing; actuating the clutch includes applying fluid pressure to a port of the hybrid module housing; clocking the input shaft includes rotating the input shaft in response to an axial translation force being greater than a threshold force; the method further includes biasing the hybrid module housing axially relative to the input shaft; the method further includes engaging a plurality of alignment pins with mating features defined by the hybrid module housing; and/or clocking the input shaft relative to the hybrid module housing includes: rotating the gripper while inhibiting rotation of the hybrid module housing, rotating the gripper and the hybrid module housing, or a combination of rotating the gripper while inhibiting rotation of the hybrid module housing and rotating the gripper and the hybrid module housing.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
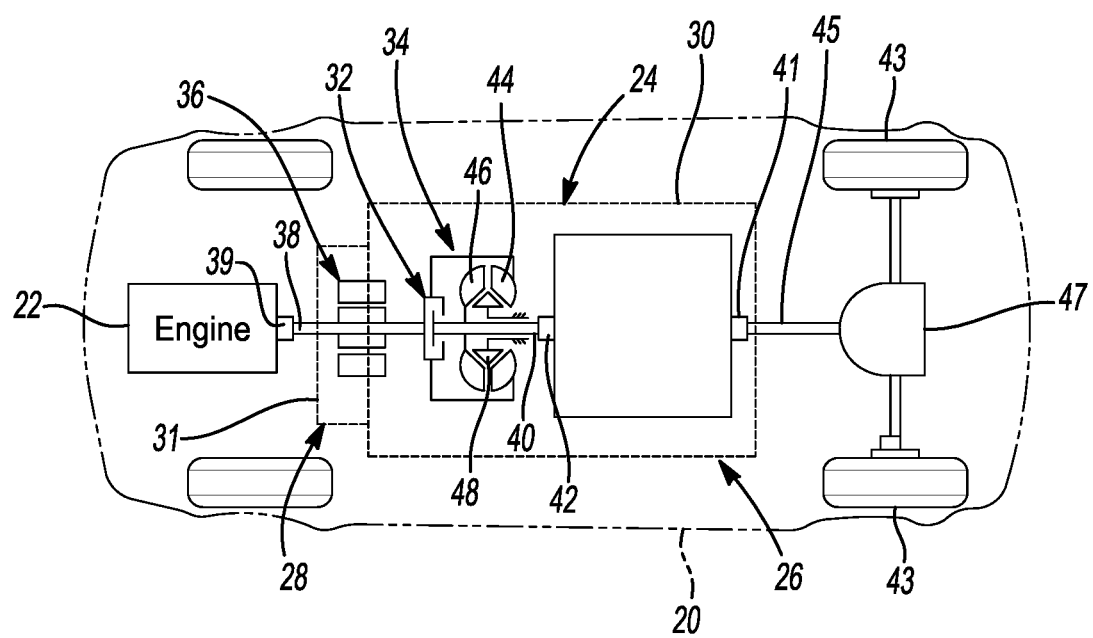
FIG. 1 is schematic view of a hybrid vehicle showing a transmission assembly including a hybrid module and a transmission module to be assembled by a tooling system constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a hybrid vehicle 20 includes an internal combustion engine 22 and a transmission assembly 24. The transmission assembly 24 includes a transmission module 26 and a hybrid module 28 installed into a housing 30 of the transmission module 26 and disposed at a front end of the transmission module 26. The hybrid module 28 includes a clutch 32, a torque converter 34, and an electric motor 36. When the hybrid module 28 is installed to the transmission module 26, the torque converter 34 is completely disposed inside the housing 30 of the transmission module 26 and the electric motor 36 is partially disposed inside the housing 30 of the transmission module 26 and partially in a housing 31 of the hybrid module 28. The hybrid module 28 includes an input shaft 38 drivingly coupled to a crankshaft 39 of the engine 22 to receive input torque therefrom and an output shaft 40 drivingly coupled to an input shaft 42 of the transmission module 26. In the example provided, the input shaft 38 is engaged for common rotation with the crankshaft 39 and the output shaft 40 engaged for common rotation with the input shaft 42. The input shaft 38 and the output shaft 40 of the hybrid module 28 are also the input shaft and the output shaft, respectively, of the torque converter 34.

The transmission module 26 can be driven by the engine 22, the electric motor 36, or both the engine 22 and the electric motor 36. In one variation, not specifically shown, a disconnect clutch can optionally be disposed between the crankshaft 39 and the input shaft 38 to selectively disconnect the engine 22 from the input shaft 38. Power from the engine 22 can be transmitted to the input shaft 42 of the transmission module 26 through the input shaft 38 and the output shaft 40 of the hybrid module 28 via the torque converter 34 or the clutch 32. The torque converter 34 includes an impeller 44, a turbine 46, and a stator 48 that cooperate with hydraulic fluid (not shown) within the torque converter 34 to provide the output shaft 40 with a multiple of the torque provided by the input shaft 38. The impeller 44 is drivingly coupled to the input shaft 38 and the turbine 46 is drivingly coupled to the output shaft 40. When engaged, the clutch 32 couples the turbine 46 to the impeller 44 for common rotation and equal torque. When the clutch 32 is disengaged, the output shaft 40 of the hybrid module 28 can rotate relative to the input shaft 38 of hybrid module 28 such that the output shaft 40 is driven by the hydraulic coupling action of the torque converter 34 to multiply output torque. In one form, the clutch 32 may be a KO clutch. In the example provided, an output shaft 41 of the transmission module 26 can be drivingly coupled to a set of drive wheels (e.g., rear drive wheels 43) such as via a propshaft 45 and a rear axle assembly 47, though other configurations can be used.

Figure 2:
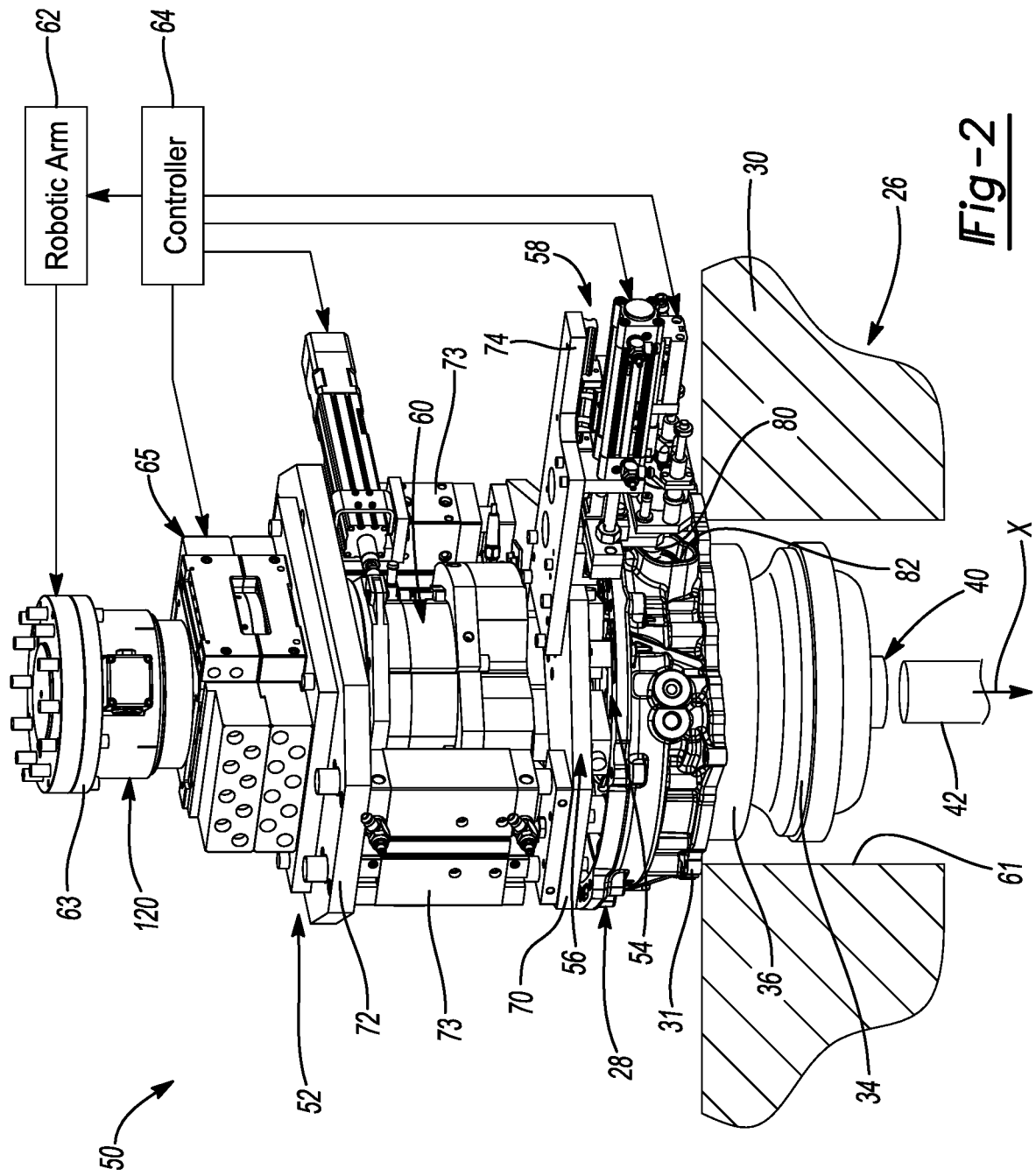
FIG. 2 is a perspective view of a tooling system constructed in accordance with the teachings of the present disclosure, showing a hybrid module being gripped by the tooling system and positioned relative to a transmission module for installation.
Figure 3:
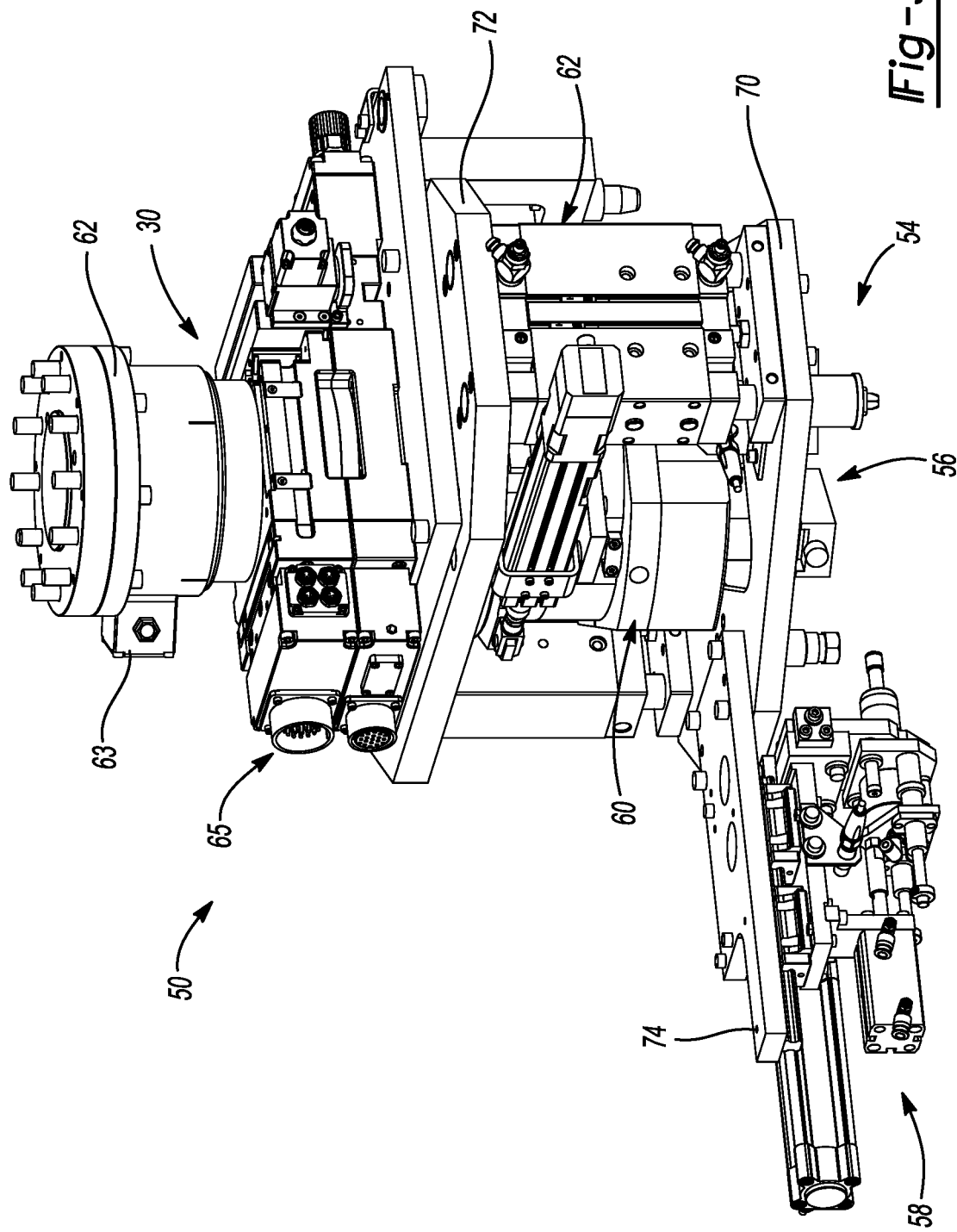
FIG. 3 is another perspective view of a tooling system constructed in accordance with the teachings of the present disclosure.

Referring to FIGS. 2 and 3, a tooling system 50 constructed in accordance with teachings of the present disclosure for installing a hybrid module 28 into a housing 30 of the transmission module 26 may be mounted to a positioning device 62 and controlled by a controller 64. In the example provided, the positioning device 62 is a robotic arm that is coupled to a flange 63 of the tooling system 50 and the controller 64 is connected to the tooling system via terminals 65. Accordingly, the positioning device 62 is also referred to herein as the robotic arm 62, though other types of positioning devices can be used. The controller 64 may be configured to control operation of both the robotic arm 62 and the tooling system 50. The controller 64 may be configured to control operation of the robotic arm 62 to move or position the tooling system 50 relative to the hybrid module 28 before gripping of the hybrid module 28 and/or position the hybrid module 28 relative to the transmission module 26 after gripping of the hybrid module 28. The controller 64 may also be configured to control the operation of various devices of the tooling system 50 to perform actions, such as positioning and gripping of the hybrid module 28, actuating a clutch 32 (FIG. 1) inside the hybrid module 28, and rotating an input shaft 38 (FIG. 1) relative to a housing 31 of the hybrid module 28. The controller 64 may include the appropriate robot style program, dependent upon the level (distance in z-axis) and type of engagement (bushing, spline, planet/sun gear mesh or d-flat) between the output shaft 40 of the hybrid module 28 and the input shaft 42 of the transmission module 26. Alternatively, the controller 64 may be separate from a controller that controls the operation of the robotic arm 62 and is dedicated to controlling the operation of the tooling system 50.

The tooling system 50 may include a support structure 52, a positioning device 54 mounted to the support structure 52 for positioning the tooling system 50 relative to the hybrid module 28 such that the center of the tooling system 50 is aligned with the input shaft 38 (FIG. 1) of the hybrid module 28 along an assembly axis X, a gripper 56 for gripping the input shaft 38 (FIG. 1) of the hybrid module 28, a clutch actuator 58 for actuating a clutch 32 (FIG. 1) inside the hybrid module 28, and a rotating base 60 for rotating the gripper 56 about the assembly axis X.

During installation, the tooling system 50 grips the hybrid module 28 and moves the hybrid module 28 into an opening 61 of the housing 30 of the transmission module 26 in a vertical orientation. To properly install the hybrid module 28 to the transmission module 26, the housing 31 of the hybrid module 28 must be seated on the housing 30 of the transmission module 26 for subsequent fastening connection (e.g., screw connection) and the output shaft 40 of the hybrid module 28 must properly engage the input shaft 42 of the transmission module 26. The controller 64 is configured to control timing/operation of the positioning device 54, the gripper 56, the clutch actuator 58, the rotating base 60, and the robotic arm 62 based on signals from a plurality of sensors mounted to the tooling system 50 during installation.

The support structure 52 includes a base support 70, an upper support 72, linear actuators (e.g., piston-cylinder assemblies 73) disposed between the base support 70 and the upper support 72, and a side bracket 74 mounted to and extending laterally from the base support 70. In one form, the base support 70 and the upper support 72 may be plates or brackets. The linear actuators 73 are configured to move the base support 70 linearly along the X axis relative to the upper support 72. In the example provided, the linear actuators 73 are piston-cylinder actuators that include cylinders mounted to the upper support 72 and pistons mounted to the base support 70, though other configurations or types of linear actuators can be used (e.g., screw actuators, solenoid actuators, rack and pinion). In the example provided, the pistons are freely movable within the cylinders to provide damping to the hybrid module 28 during installation, which will be described in more detail later.

Figure 8:
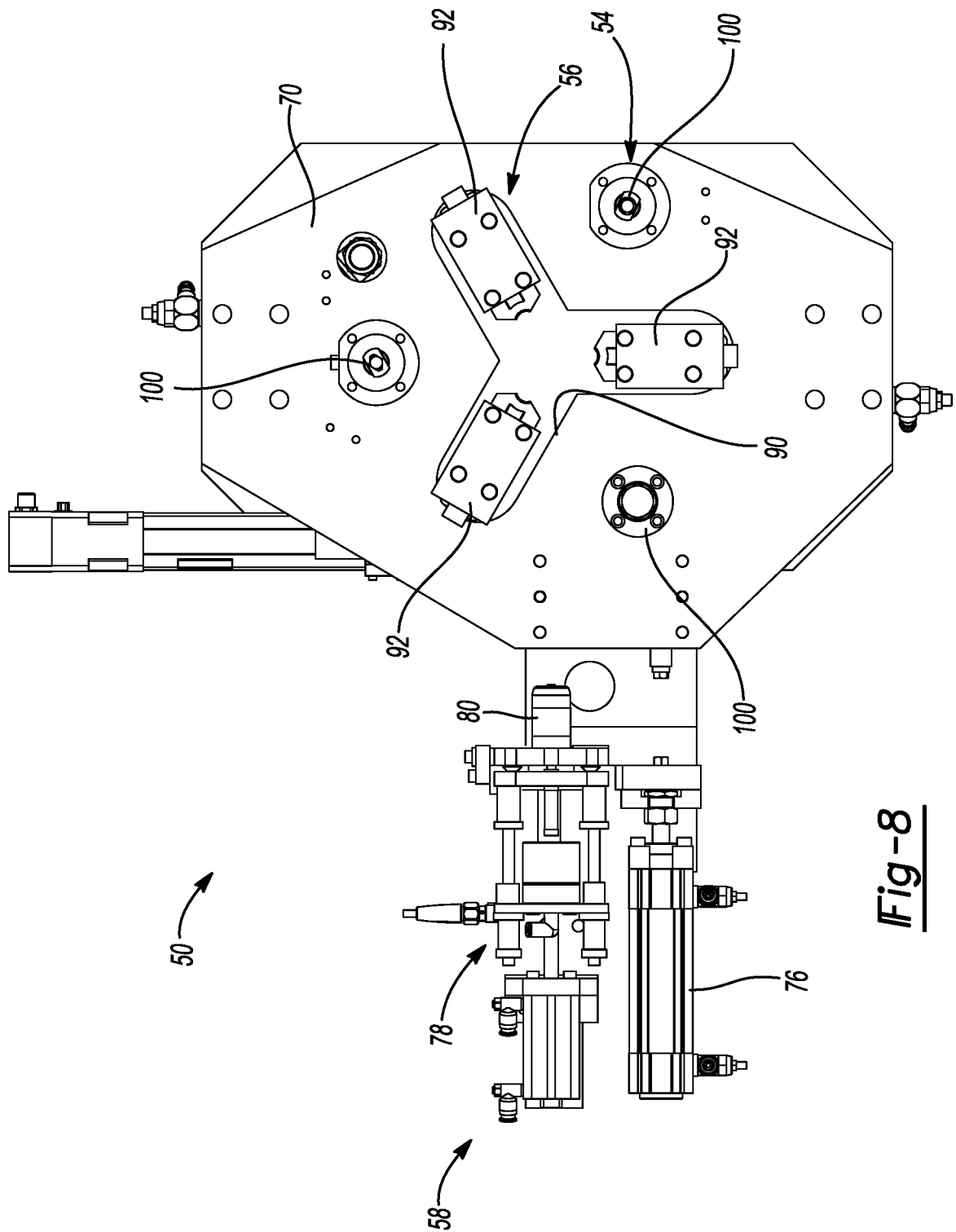
FIG. 8 is a bottom view of the tooling system of FIG. 3, showing a gripper in an open position.
Figure 9:
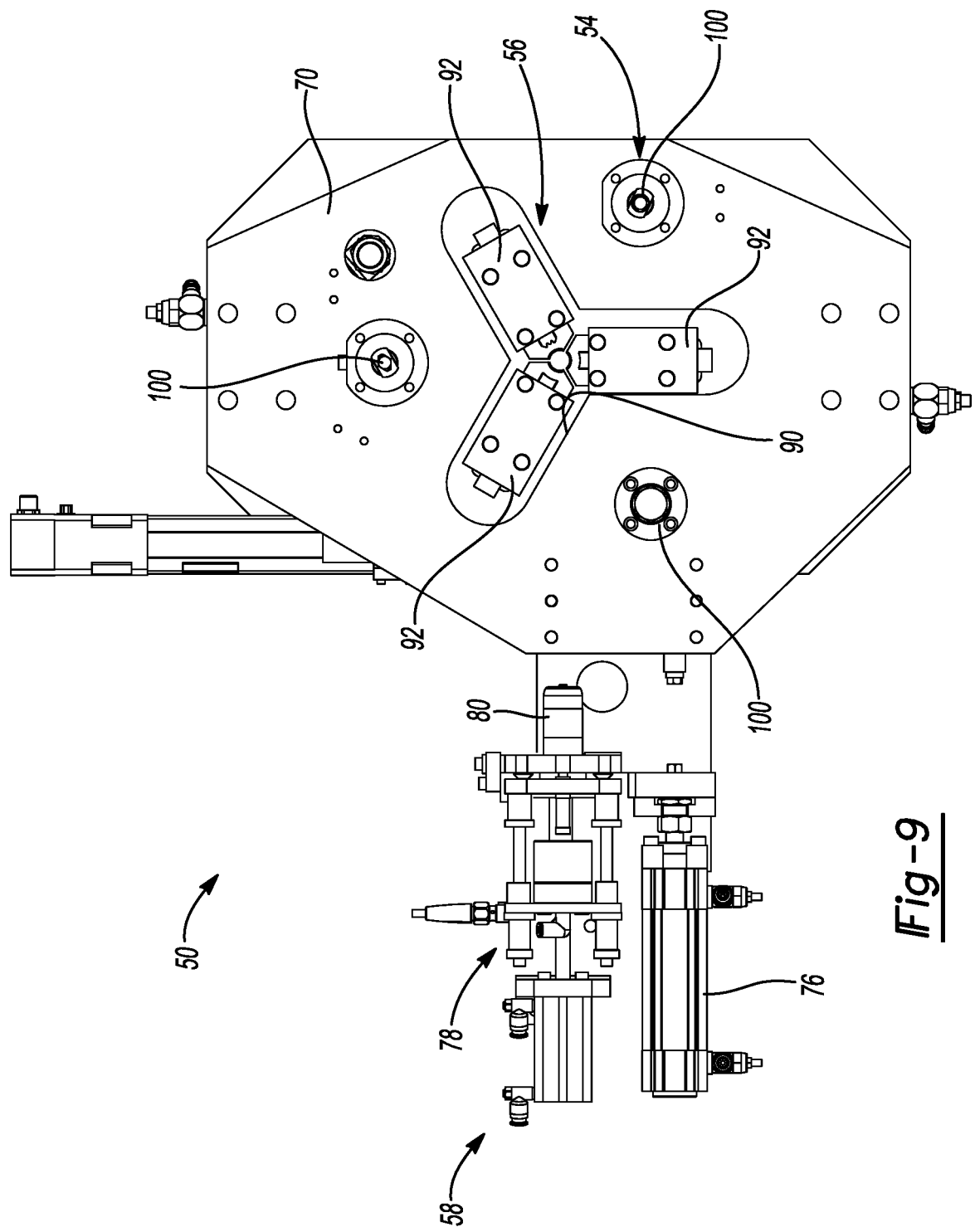
FIG. 9 is a view similar to FIG. 8, showing the gripper in a closed position.

The positioning device 54 is mounted to and extends downwardly from the base support 70. The rotating base 60 is rotatably disposed between the base support 70 and the upper support 72. The gripper 56 is disposed under the base support 70 and mounted to a bottom of the rotating base 60 through an opening 90 (shown in FIGS. 8 and 9) of the base support 70. The clutch actuator 58 is supported by and disposed under the side bracket 74.

Figure 4:
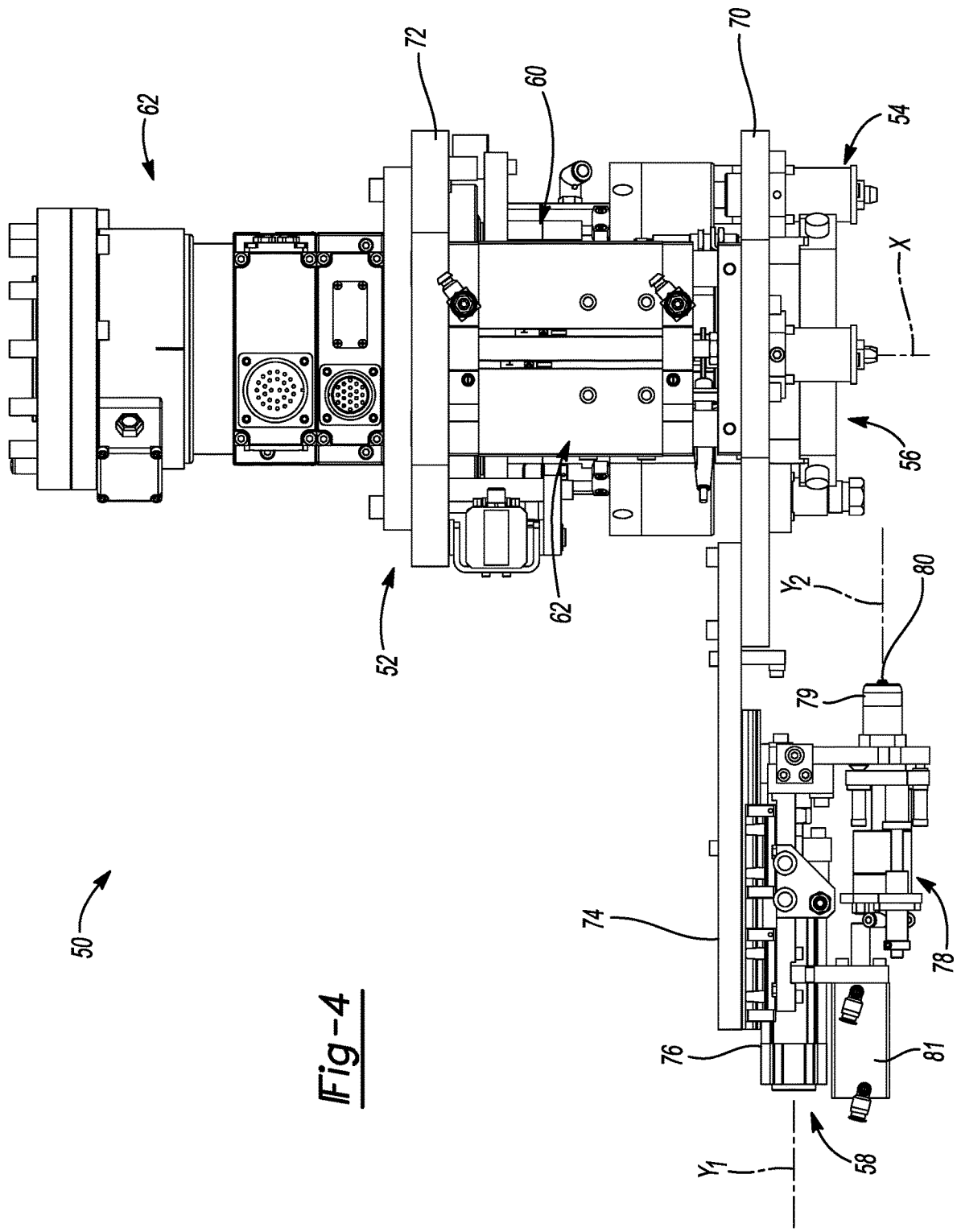
FIG. 4 is a front view of the tooling system of FIG. 3, showing a clutch actuator in a retracted position.
Figure 5:
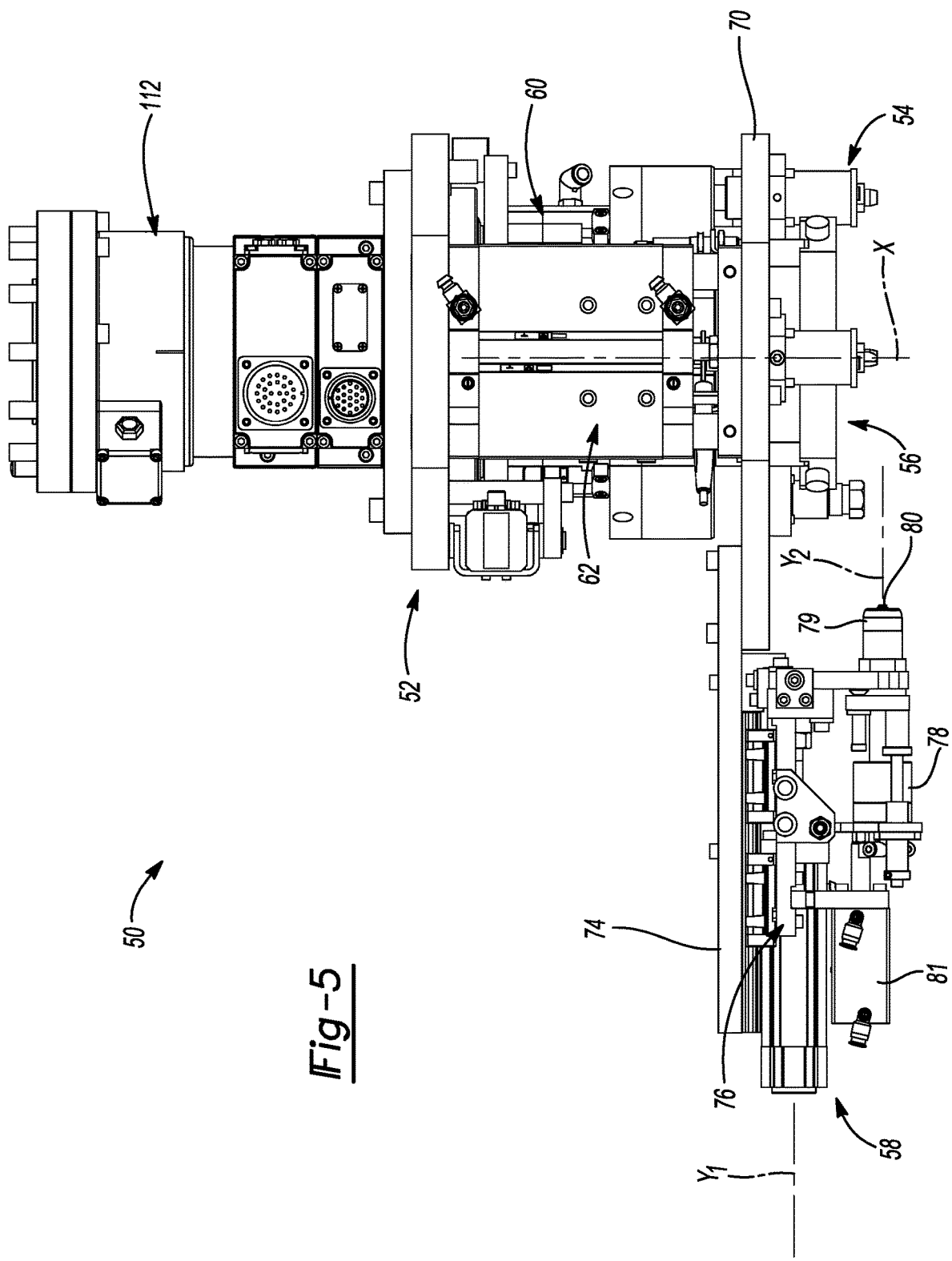
FIG. 5 is a view similar to FIG. 4, showing the clutch actuator in an extended position.

Referring to FIGS. 4 and 5, the clutch actuator 58 is mounted below and supported by the side bracket 74 that extends outwardly from the base support 70 of the support structure 52. The clutch actuator 58 is configured to cause the clutch 32 to engage inside the hybrid module 28 during installation to facilitate installation of the hybrid module 28 into the transmission module 26.

Figure 6:
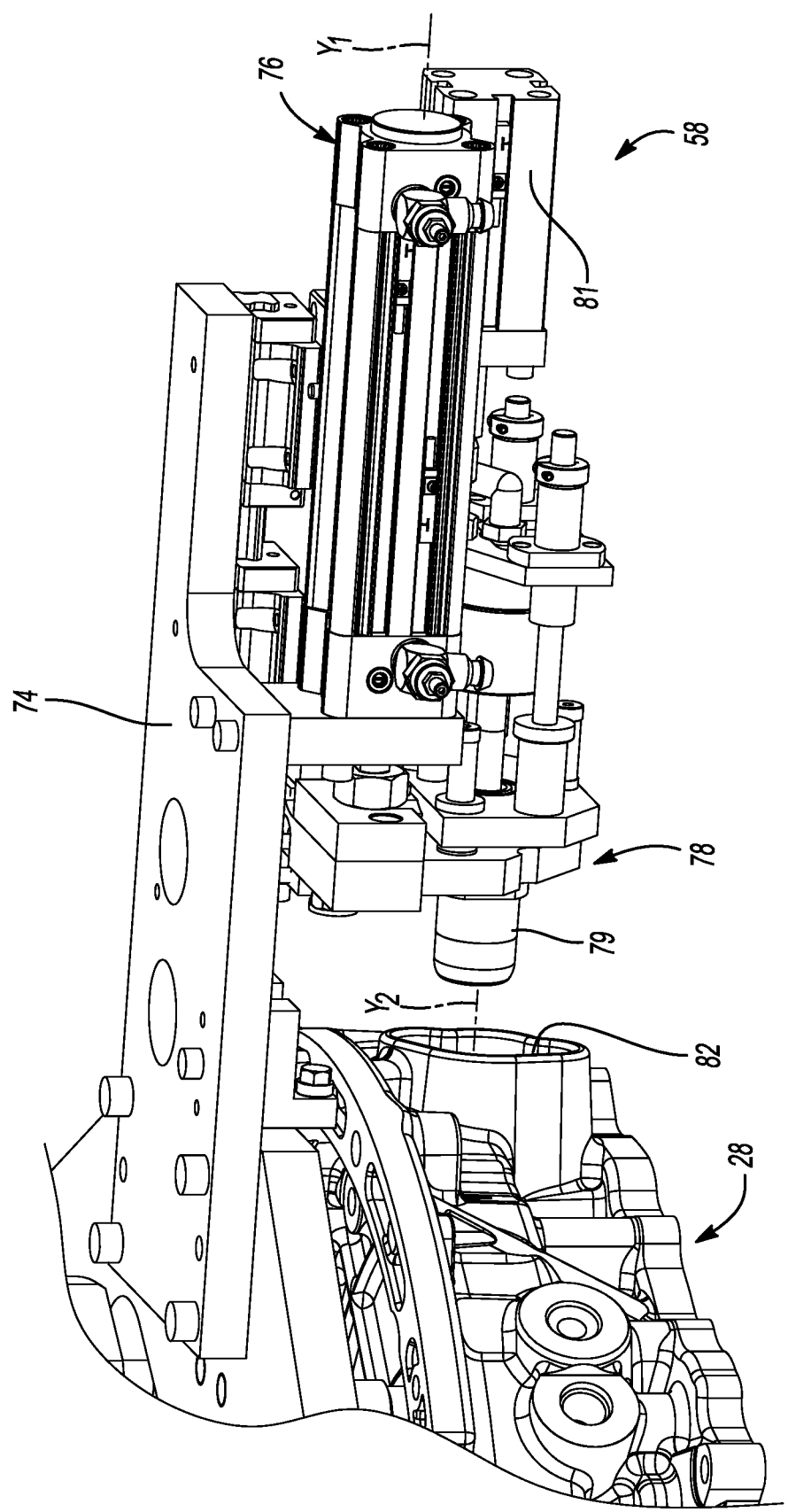
FIG. 6 is a perspective view of a clutch actuator mounted to a support structure of the tooling system, showing a nozzle aligned with a side opening of a hybrid module.
Figure 7:
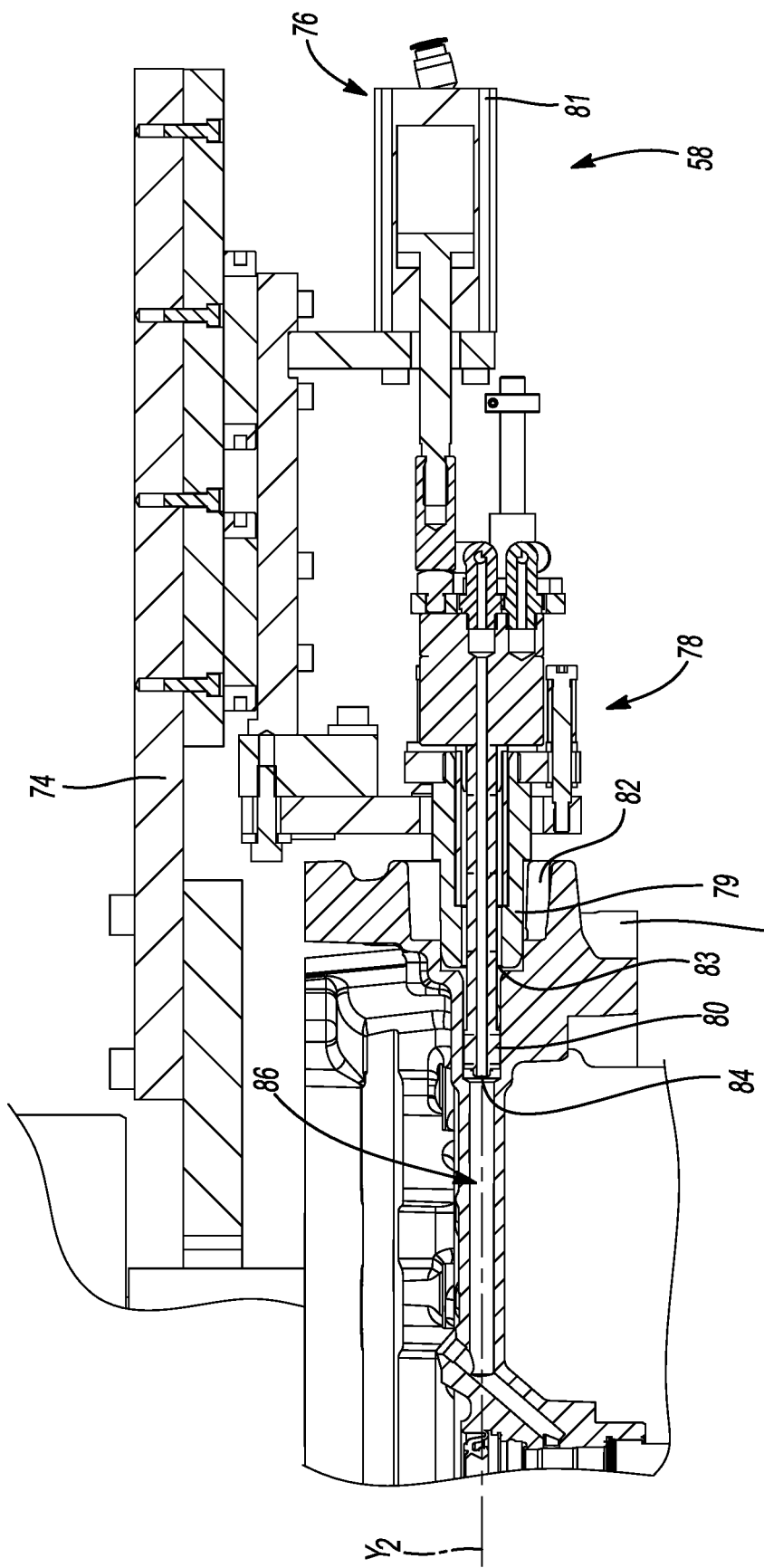
FIG. 7 is cross-sectional view of FIG. 6.

The clutch actuator 58 includes a linear actuator 76, a nozzle 78 coupled to the linear actuator 76. The nozzle 78 includes a nose piece 79, a probiscis 80, and a linear actuator 81. The linear actuator 76 is configured to move the nozzle 78 between a retracted position (as shown in FIGS. 4 and 6) and an extended position (as shown in FIGS. 5 and 7). In the example provided, the linear actuator 76 includes a cylinder-piston assembly, though other types of linear actuators can be used (e.g., screw actuators, solenoid actuators, rack and pinion). The nozzle 78 is coupled to a piston of the linear actuator 76 such that the nozzle 78 is moved by the piston of the linear actuator 76 along axis Y which is transverse to axis X. In the example provided, axis Y is perpendicular to axis X, though other configurations can be used. The nozzle 78 can be generally more toward a center of the tooling system 50 when the clutch actuator 58 is in the extended position than when in the retracted position. The linear actuator 81 is configured to move the probiscis 80 relative to the nose piece 79 along an axis $Y_2$ between a retracted position (as shown in FIGS. 4-6) and an extended position (as shown in FIG. 7) in which the probiscis 80 extends further from the nose piece 79 than in the retracted position. In the example provided, axis $Y_2$ is parallel to axis $Y_1$, though other configurations can be used. As described in further detail below, the linear actuator 81 can move the probiscis 80 into sealing contact with a port inside the hybrid module 28 when the clutch actuator 58 is in the extended position.

Referring to FIG. 6, when the tooling system 50 is properly positioned relative to the hybrid module 28, the nose piece 79 is aligned with a side opening 82 of the housing 31 of the hybrid module 28 and disposed outside the side opening 82 when the linear actuator 76 is in the retracted position.

Referring to FIG. 7, when the linear actuator 76 is moved to the extended position, the nozzle 78 is translated by the piston of the linear actuator 76 toward the housing 31 of the hybrid module 28. In this extended position, a proximal end of the nose piece 79 is inserted into the side opening 82 and seats on a surface 83 within the side opening 82. Then, the linear actuator 81 moves the probiscis 80 inside the nose piece 79 forward to the extended position until sealing contact with a port 84 further within the side opening 82 than the surface 83. The port 84 is in fluid communication with a fluid circuit 86 of the clutch 32 (FIG. 1). The nozzle 78 then applies fluid pressure (e.g., air pressure or hydraulic fluid pressure) into the fluid circuit 86 through the port 84, causing the clutch 32 to engage. As a result, the torque converter 34 is locked and the output shaft 40 of the hybrid module 28 cannot freely rotate relative to the input shaft 38 of the hybrid module 28. After the hybrid module 28 is properly installed, fluid pressure is released and the probiscis 80 and the nozzle 78 are moved away from the hybrid module 28, causing the clutch 32 to disengage.

Figure 13:
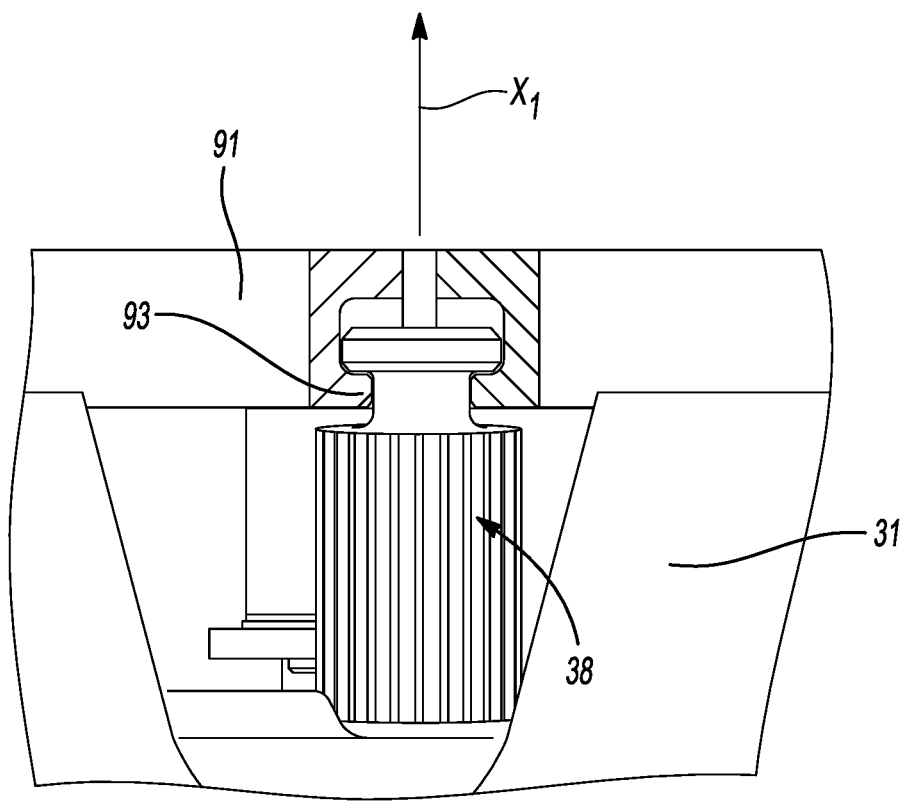
FIG. 13 is a partial cross-sectional view of FIG. 10.

Referring to FIGS. 8 to 11, the base support 70 defines an opening 90 to expose a bottom of the rotating base 60 such that the gripper 56 can be mounted to a bottom surface of the rotating base 60 and can be rotatable with the rotating base 60. The gripper 56 includes a plurality of guiding rails 94 (shown in FIGS. 10 and 11) mounted to the rotating base 60, a plurality of first jaw members 91, and a plurality of second jaw members 92. The first jaw members 91 are slidably mounted on the guiding rails 94 and are movable between an open position (shown in FIG. 8) and a closed position (shown in FIG. 9). In one form, the gripper 56 may include three first jaw members 91 arranged to form a Y configuration. In one form, the opening 90 of the base support 70 may also have a Y-configuration, though other opening shapes may be used such as the generally triangular opening 90 illustrated in FIGS. 11 and 15 for example. With additional reference to FIG. 13, each first jaw member 91 includes a puller portion 93 configured to engage and pull the end of the input shaft 38 in the direction $X_1$ (labeled in FIG. 13, e.g., upwards) relative to the housing 31. When the first jaw members 91 are moved to the closed position, the first jaw members 91 move toward the center of the gripper 56 and can engage the end of the input shaft 38.

Figure 10:
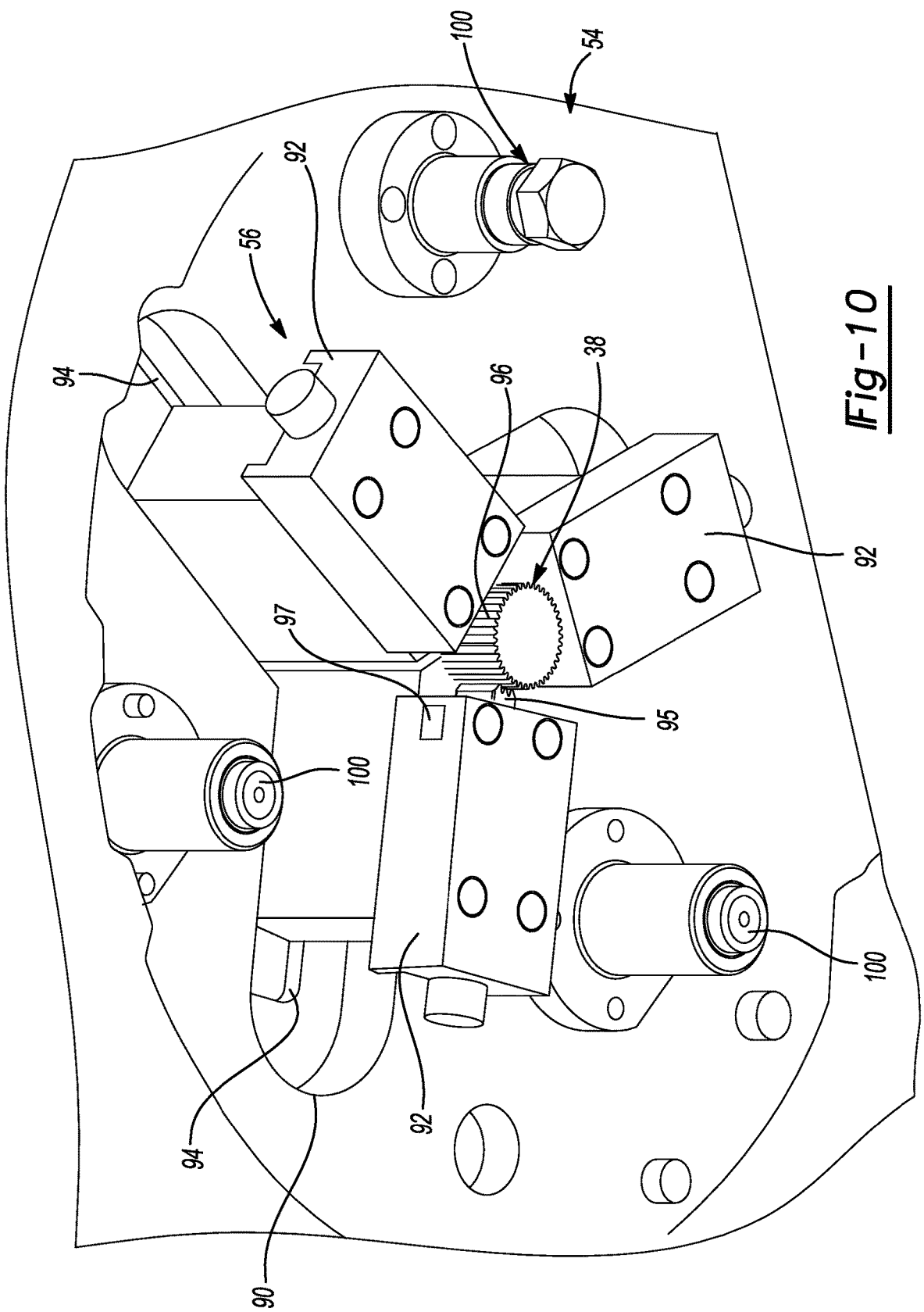
FIG. 10 is a perspective view of a gripper and a positioning device of a tooling system of FIG. 3, showing the gripper gripping an input shaft.
Figure 11:
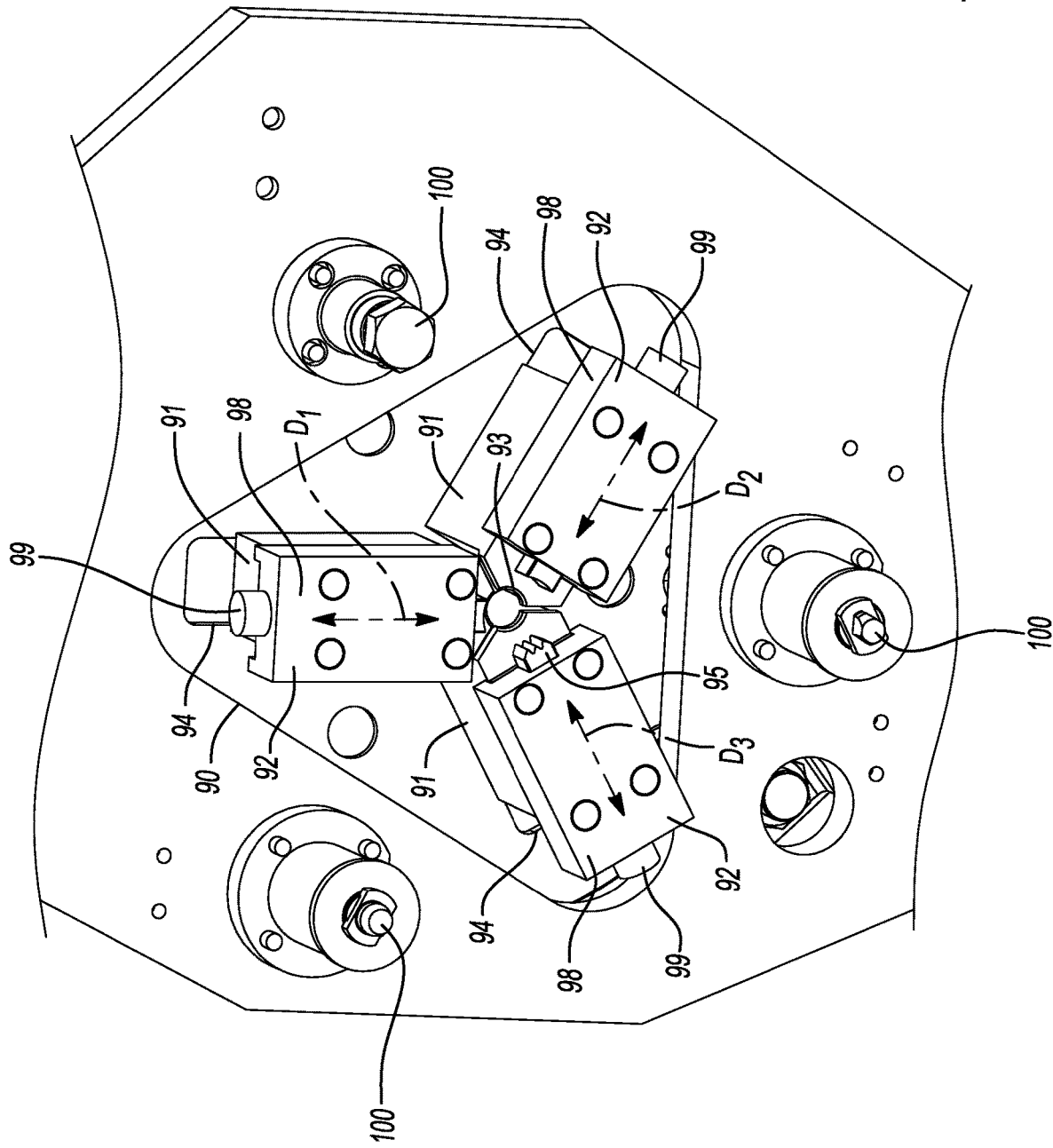
FIG. 11 is a view similar to FIG. 10, without showing the input shaft.
Figure 12:
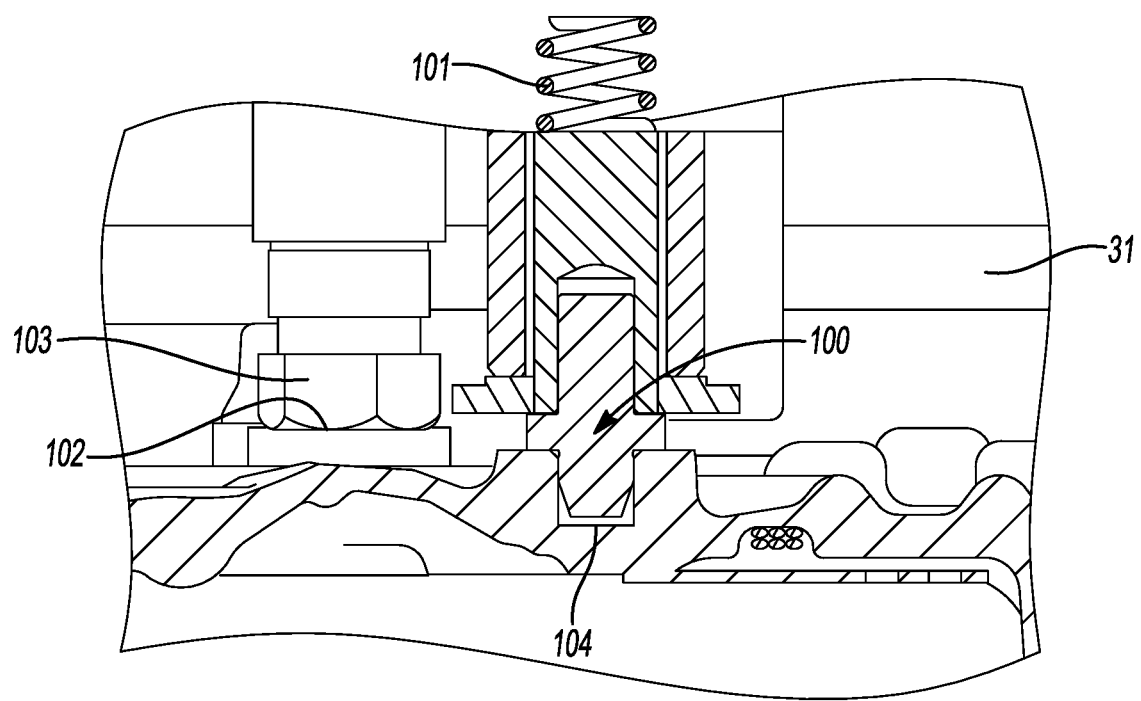
FIG. 12 is a partial cross-sectional view showing an alignment pin of a tooling system inserted into a corresponding positioning hole of the hybrid module.

Referring to FIGS. 10 and 11, each second jaw member 92 is coupled to a corresponding one of the first jaw member 91 for movement therewith. The proximal ends of the second jaw members 92 each include engaging features 95 configured to positively engage the structure features 96 of the input shaft 38. In one form, the structure features 96 are splines or teeth on the outer surface of the input shaft 38 of the hybrid module 28. Therefore, the engaging features 95 of the second jaw members 92 may also have a mating spline structure for engaging the splines 96 on the input shaft 38.

In one form, each second jaw member 92 has a base portion 98 (labeled in FIG. 11) that is fixedly coupled to the corresponding first jaw member 91 and the engaging features 95 are movable relative to a base portions 98 along corresponding axes $D_1$, $D_2$, $D_3$ (shown in FIG. 11) by corresponding linear actuators 99 (labeled in FIG. 11). The linear actuators 99 can be any suitable type of linear actuator (e.g., piston-cylinder, screw, solenoid, rack and pinion). In another form, the linear actuator 99 can be replaced with a spring (not shown) to provide axial compliance in the directions $D_1$, $D_2$, and $D_3$.

Thus, when the second jaw members 92 are moved to the closed position, the second jaw members 92 move toward the center of the gripper 56 and can engage the input shaft 38 of the hybrid module 28. When the input shaft 38 is gripped by first and second jaw members 91, 92 of the gripper 56, rotating the rotating base 60 causes rotation of the gripper 56 and the input shaft 38 relative to the housing 31 of the hybrid module 28. The tooling system 50 may further include a grip sensor 97 (schematically shown in FIG. 10) for detecting the presence of the input shaft 38 of the hybrid module 28 in the gripper 56. In response to a signal from the grip sensor 97 indicating the presence of the input shaft 38, the controller 64 may control a mechanism associated with the gripper 56 to move the first and second jaw members 91, 92 of the gripper 56 to the closed position to grip the input shaft 38 of the hybrid module 28.

While not shown in the drawings, the tooling system 50 may be equipped with a tool changer, which allows a plurality of grippers to be used with smaller or larger hybrid front modules. This is especially helpful when installing smaller versions of the hybrid module.

As further shown in FIGS. 8 to 12, the positioning device 62 includes a plurality of alignment pins 100 and a rest pin 103 extending downwardly from the base support 70 of the support structure 52. The alignment pins 100 are configured to be inserted into corresponding positioning holes 104 in the housing 31 of the hybrid module 28 for positioning the tooling system 50 relative to the hybrid module 28 in the radial direction, i.e., so that the gripper 56 is centered on the input shaft 38 of the hybrid module 28. The rest pin 103 is configured to engage a flat surface 102 (also referred to as a contact pad) of the housing 31 in order to align the tooling system 50 in the axial direction, i.e., along axis X (shown in FIG. 2). The rest pin 103 can act as a positive stop in the axial direction or may also provide axial compliance via a spring (not shown). The alignment pins 100 have a ramped or conical end for assisting alignment with the positioning holes 104. In one form, the tooling system 50 may include two alignment pins 100 and one rest pin 103 that are disposed at 120 degrees apart along a circumferential direction about the axis X (FIG. 2) of the base support 70. It is understood that any number of alignment pins 100 and/or rest pins 103 may be provided without departing from the scope of the present disclosure.

In one form, one of the alignment pins 100 may have an engaging feature different from that of the other alignment pin 100. Similarly, one of the positioning holes 104 in the hybrid module 28 may have a mating feature different from the other alignment hole for mating the engaging feature of the alignment pin 100. As such, the alignment pins 100 can only be received in the mating positioning hole 104 to ensure proper alignment. This allows for axial positioning, rotational positioning, and radial positioning of the tooling system 50 relative to the hybrid module 28. Therefore, the nozzle 78 of the clutch actuator 58 is aligned with the side opening 82 of the hybrid module 28 when the tooling system 50 is properly positioned relative to the hybrid module 28. For example, one of the alignment pins 100 may have a hexagonal end, whereas the other alignment pin 100 may have a circular end, though other configurations can be used such as different sized cylindrical shapes for example.

The positioning device 54 further includes a plurality of springs 101 at ends of the alignment pins 100 distal from the hybrid module 28 to bias the alignment pins 100 axially against the hybrid module 28 during installation. The springs 101 provide damping to the hybrid module 28 to reduce impact between the hybrid module 28 and the transmission module 26 during installation, which will be explained in more detail later. The alignment pins 100 can also be biased axially toward the housing 31 by the spring 101 such that they are received in and engage the positioning holes 104 before the rest pin 103 engages the flat surface 102 in order to provide axial compliance.

Figure 14:
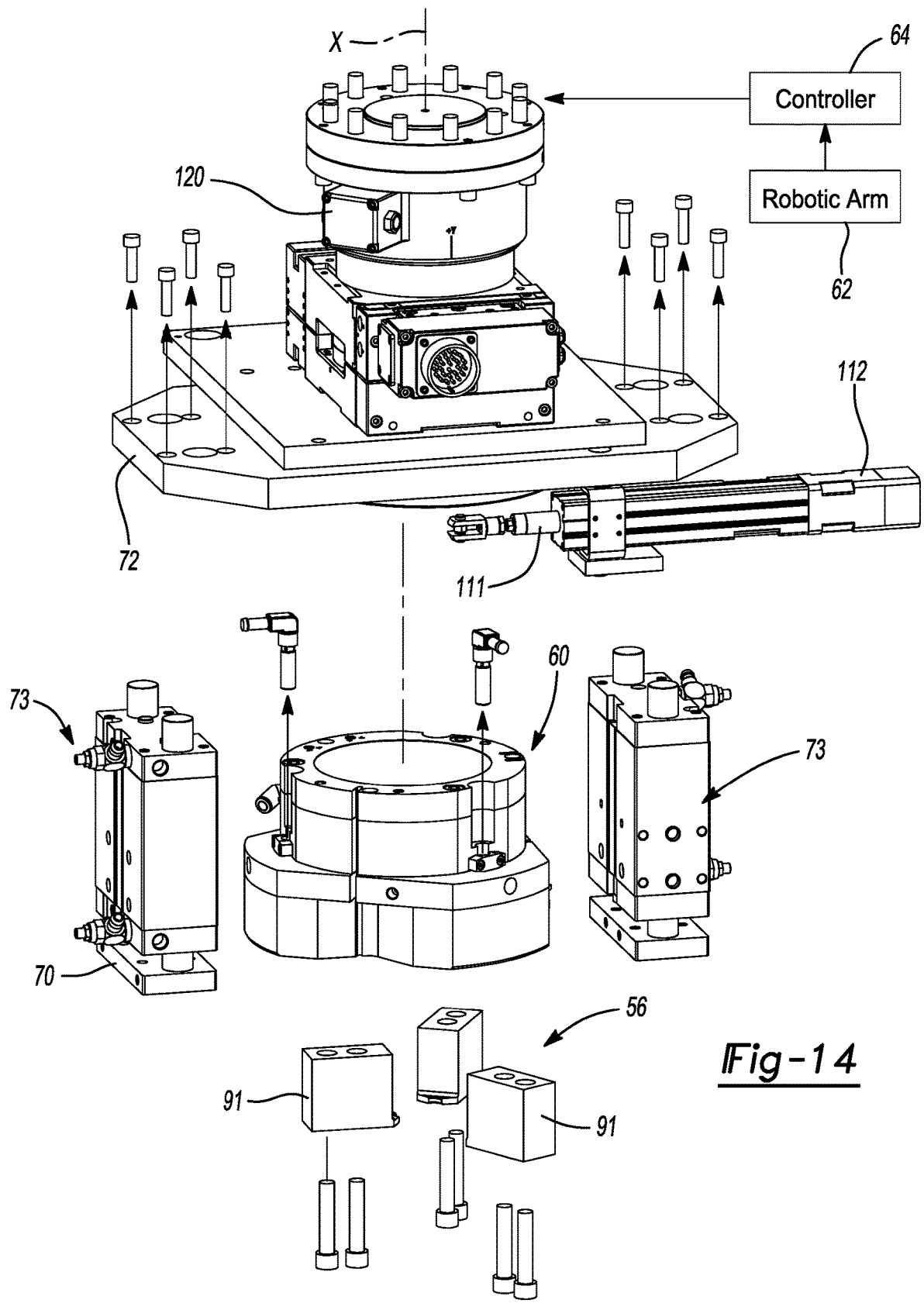
FIG. 14 is a partial exploded view of the tooling system of FIG. 3.
Figure 15:
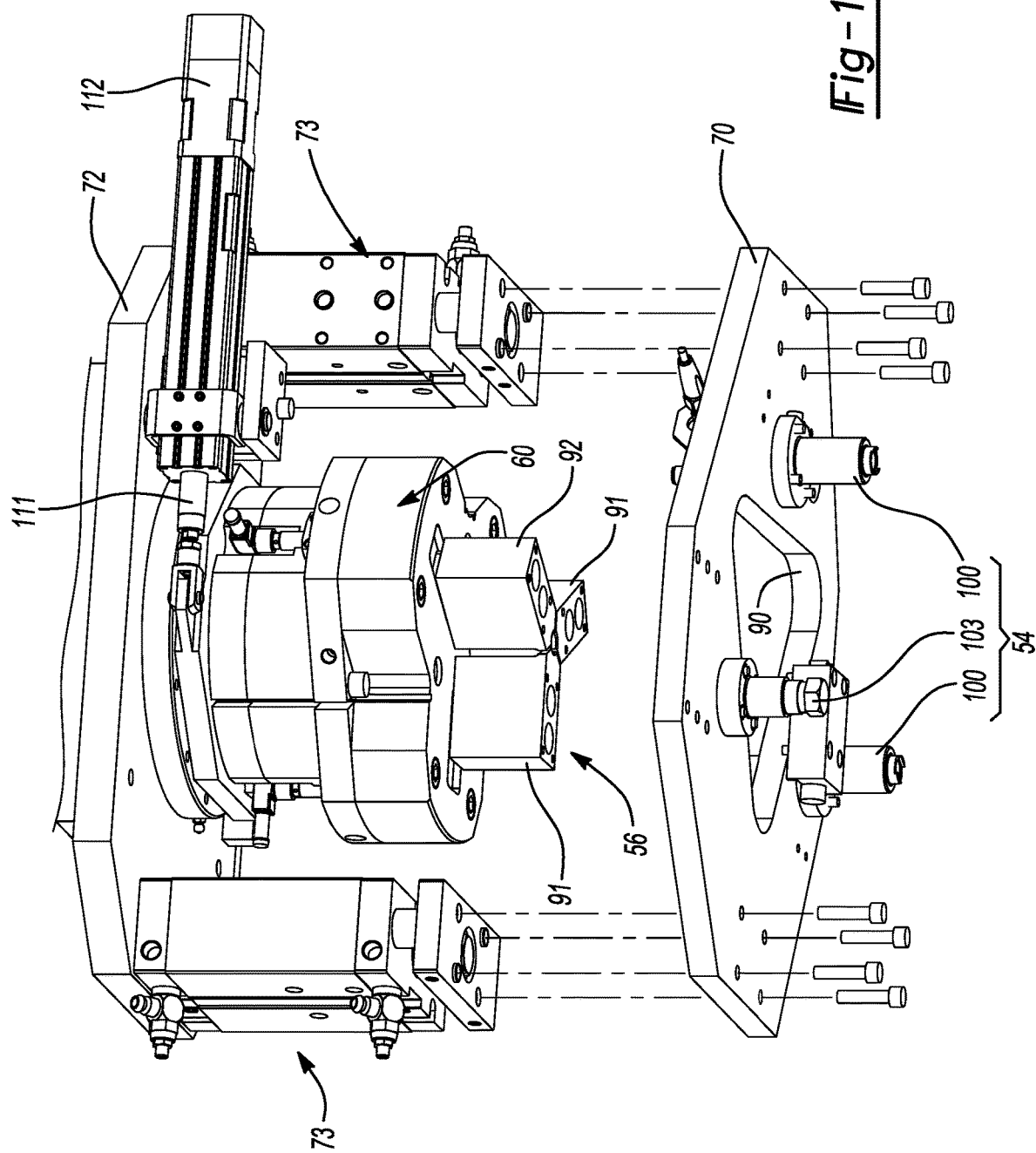
FIG. 15 is another partial exploded view of the tooling system of FIG. 3.

Referring to FIGS. 14 and 15, the rotating base 60 is disposed between the base support 70 and the upper support 72 and is drivingly coupled to the gripper 56 such that when the rotating base 60 rotates, the gripper 56 also rotates about the assembly axis X. The tooling system 50 further includes an rotational actuator 112 for rotating the rotating base 60.

In one form, shown in FIGS. 14 and 15, the rotational actuator 112 may be a linear actuator (e.g., an electric cylinder, a piston-cylinder, screw, solenoid, rack and pinion) arranged in a horizontal direction perpendicular to the assembly axis X. The linear actuator 112 can be mounted to the upper support 72 and configured to move a rod 111 linearly in the horizontal direction. The rod 111 is coupled to the rotating base 60 and provides "clocking" motion (e.g., clockwise and counter-clockwise rotation) to the rotating base 60 during engagement between the output shaft 40 of the hybrid module 28 and the input shaft 42 of the transmission module 26 and to align other gearing engagements with relation to the transmission module 26.

Similar to the input shaft 38 of the hybrid module 28, the output shaft 40 of the hybrid module 28 may have an engagement feature, e.g., splines or teeth, configured to mate with a mating engagement feature on the input shaft 42 of the transmission module 26 or other gearing of the transmission module 26. Therefore, the output shaft 40 of the hybrid module 28 needs to be rotated to a desired radial position for proper engagement with the input shaft 42 of the transmission module 26. Furthermore, other gearing engagements with the transmission module 26 can require this rotation of the output shaft 40 while the hybrid module 28 is moved axially along the X axis. In this regard, it can be important not to rotate the housing 31 of the hybrid module 28 relative to the housing 30 of the transmission module 26 to ensure proper alignment and avoid damaging seals or gaskets between the two housings 30, 31.

Prior to the rotation of the rotating base 60, the clutch actuator 58 is activated to cause the clutch 32 to engage to inhibit free rotation of the output shaft 40 relative to the input shaft 38 of the hybrid module 28. Therefore, by using the rotating base 60 to rotate the gripper 56 and the input shaft 38 gripped by the gripper 56, the output shaft 40 of the hybrid module 28 is also rotated. The "clocking" motion of the input shaft 38 of the hybrid module 28 by the rotating base 60 and the rotational actuator 112 facilitates the spline engagement between the output shaft 40 of the hybrid module 28 and the input shaft 42 of the transmission module 26. Concurrently, the robotic arm 62 is controlled to translate the tooling system 50 and the hybrid module 28 gripped by the tooling system 50 toward the transmission module 26. Therefore, the rotating base 60 and the robotic arm 62 jointly perform a seating operation including axially translating, by the robotic arm 62, the hybrid module 28 toward the transmission module 26 and "clocking", by the rotating base 60, the input shaft 38 relative to the housing 31 of the hybrid module 28. Alternatively, a translating device (not shown) separate from the robotic arm 62 may be used for translating the hybrid module 28 at this stage. In another alternative form, not shown, a translating device may translate the transmission module 26 axially.

Figure 16:
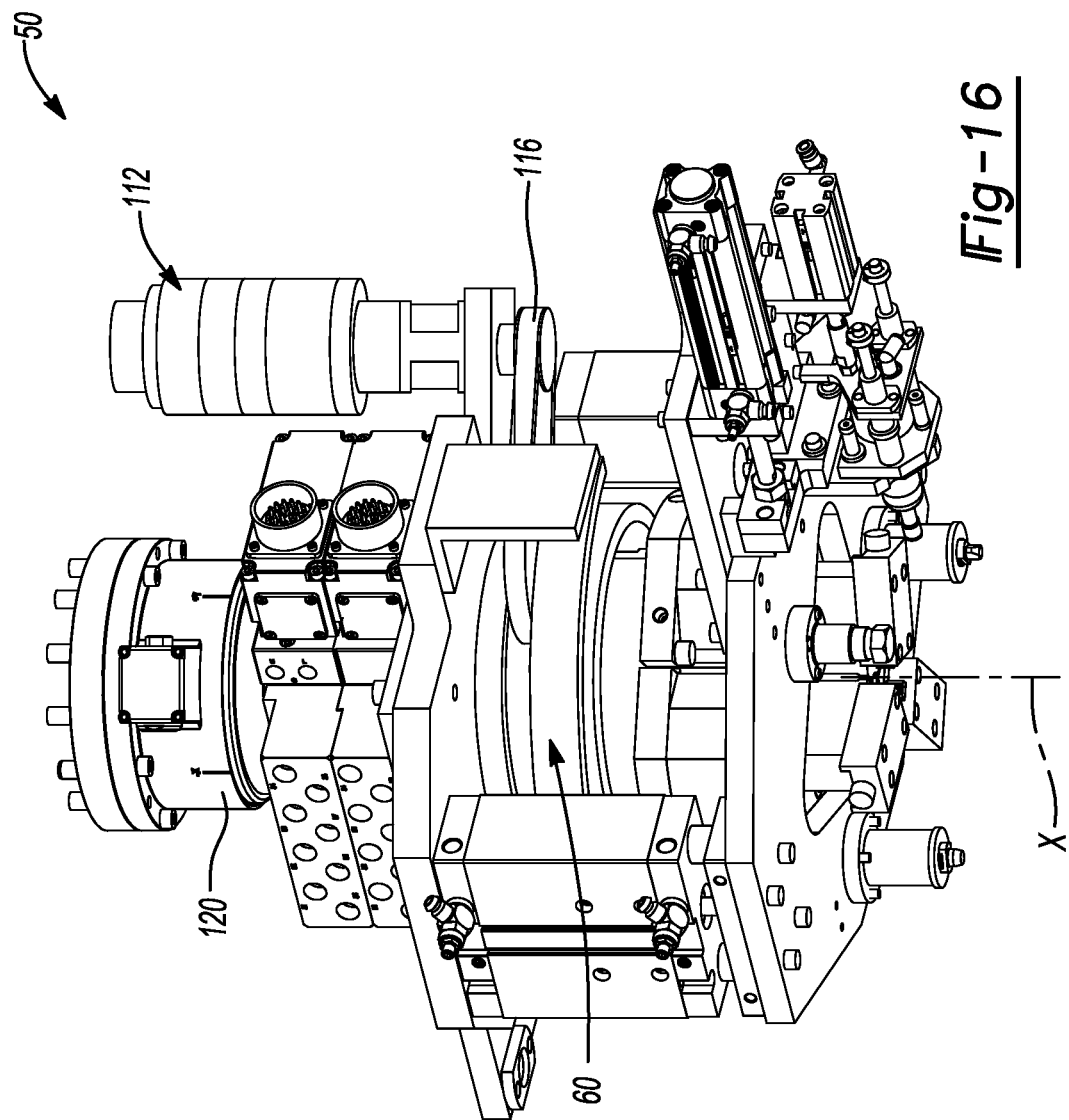
FIG. 16 is a perspective view of a variant of a tooling system constructed in accordance with the teachings of the present disclosure.
Figure 17:
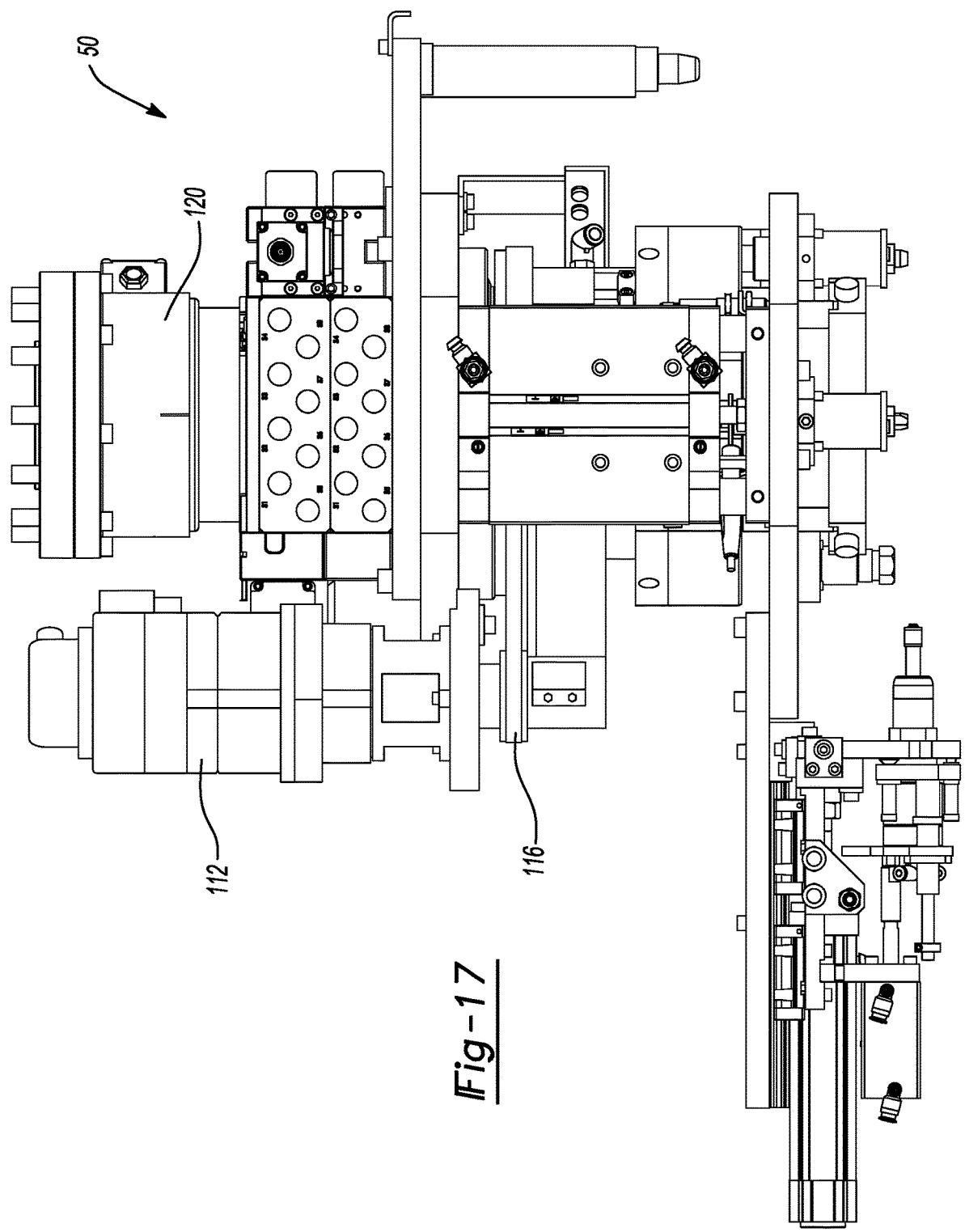
FIG. 17 is a front view of the tooling system of FIG. 16.
Figure 18:
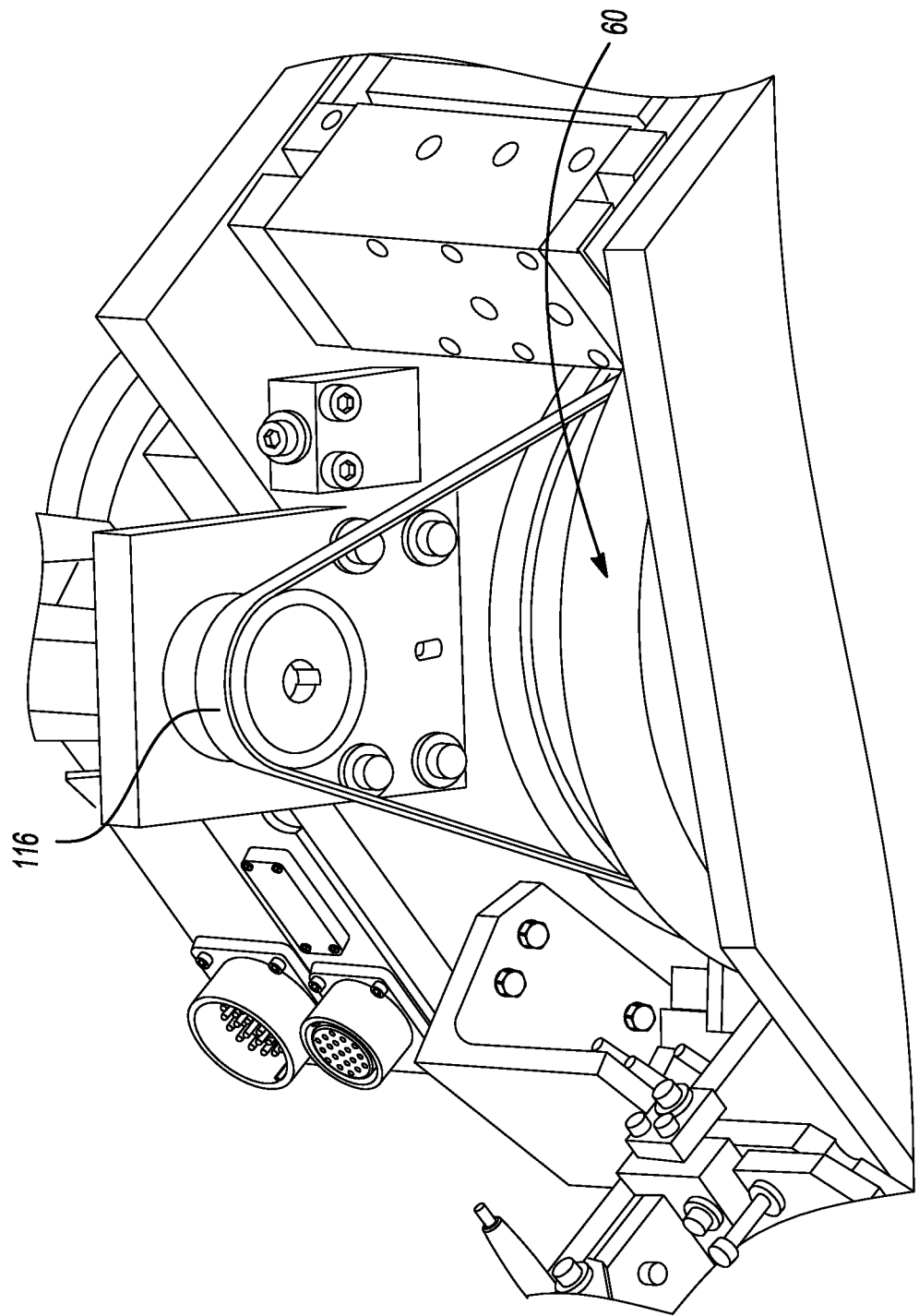
FIG. 18 is a partial perspective view of the tooling system of FIG. 16, showing the connection between a rotating base and a motor for rotating the rotating base.

Referring to FIGS. 16 to 18, alternatively, the rotational actuator 112 can be an electric motor (e.g., a servo gear motor). In one form, the rotating base 60 may be rotated the electric motor 112 is oriented in a direction parallel to the assembly axis X and is connected to the rotating base 60 by belts 116 such that the rotating base 60 is driven by the electric motor 112 via the belt 116.

Accordingly, rotational actuator 112 rotates the input shaft, which turns the torque converter, because the clutch 32 is engaged by fluid pressure (e.g., air or hydraulic pressure). By turning the input shaft, the four flats (90 degrees apart) a feature on the outer diameter of the torque converter hub can mate with the front support which is already present in the transmission module 26. This allows the next (splined) engagement to occur between the two parts. To signal the start of this step, a force control device 120 may communicate a zero force signal (in the X direction) to the controller 64, and concurrently monitors the distance moved in the X-axis and references the rotational position of the rotating base 60.

As further shown in FIGS. 14 and 16, the tooling system 50 further include the force control device 120, e.g., a transducer, to detect the force from the transmission module 26 to the hybrid module 28, i.e., the resistance to linearly translating the hybrid module 28 by the robotic arm 62 toward the housing 30 of the transmission module 26. The force control device 120 may also be configured to detect a distance between the hybrid module 28 and the transmission module 26. The controller 64 receives the signals relating to the resistance to linearly translating the hybrid module 28 axially toward the transmission module 26 and the distance between the hybrid module 28 and the transmission module 26 as a feedback and controls the rotation of the rotating base 60 and the translational movement of the robotic arm 62 accordingly.

The robotic arm 62 may be configured to translate the tooling system 50 while the rotating base 60 rotates the gripper 56 and the input shaft 38 relative to the housing 31 of the hybrid module 28. When the output shaft 40 of the hybrid module 28 is not in the desired rotational position relative to the input shaft 42 of the transmission module 26, the force control device 120 detects a resistance to moving the tooling system 50, particularly the hybrid module 28, toward the transmission module 26. The resistance from the transmission module 26 may cause the springs at the ends of the alignment pins 100 to compression, thereby avoiding harsh direct impact between the hybrid module 28 and the transmission module 26. In addition, the linear actuators 73 disposed between the base support 70 and the upper support 72 also provide damping for the hybrid module 28 by allowing the pistons to freely move in the cylinders in response to the resistance to axially translating the hybrid module 28 toward the transmission module 26.

When the output shaft 40 of the hybrid module 28 is rotated to the desired rotational position relative to the input shaft 42 of the transmission module 26, the robotic arm 62 experiences zero or little resistance to move the output shaft 40 of the hybrid module 28 toward the input shaft 42 of the transmission module 26. Therefore, the force control device 120 communicates a zero force signal to the controller 64, which in turn, controls the robotic arm 62 or a separate translating device, to further translate the hybrid module 28 toward the transmission module 26. Concurrently, due to the zero or reduced resistance from the transmission module 26, the springs may bias the alignment pins 100 of the hybrid module 28 to facilitate this translational movement. As a result, the output shaft 40 of the hybrid module 28 engages the input shaft 42 of the transmission module 26.

The force control device 120 is also configured to monitor the distance moved in the X-axis and references the rotational position (e.g. servo position). The controller 64 then determines whether the output shaft 40 of the hybrid module 28 and the input shaft 42 have properly engaged and whether the distance between the hybrid module 28 and the transmission module 26 is zero. When the installation is complete, the controller 64 controls the gripper 56 to move to the open position to release the input shaft 38 of the hybrid module 28, and deactivates the clutch actuator 58 to disengage the clutch 32. The robotic arm 62 then moves the tooling system 50 away from the transmission module 26 along the assembly axis X, thereby completing the installation.

Figure 19:
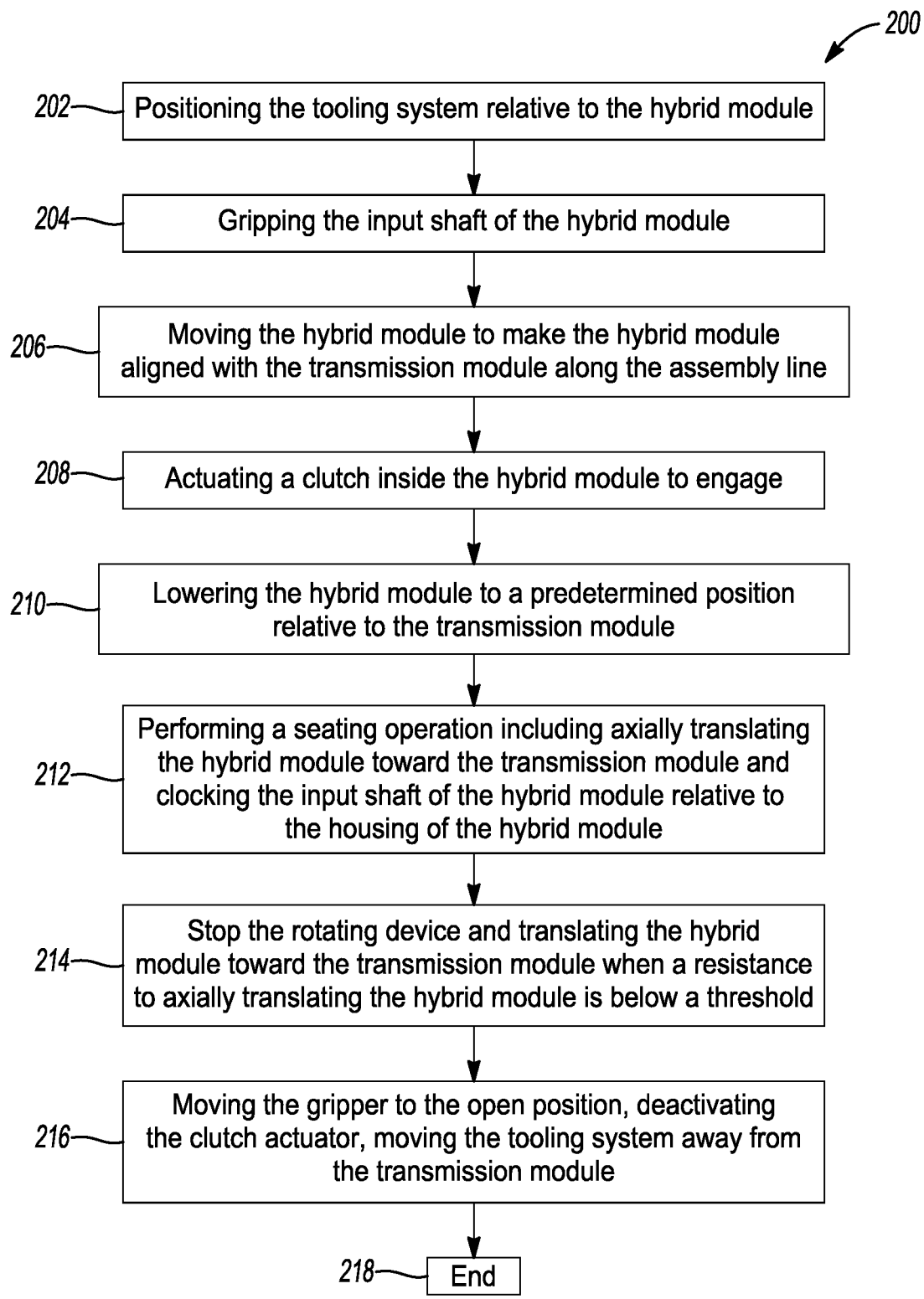
FIG. 19 is a flowchart of a method of installing a hybrid module into a transmission module in accordance with the teachings of the present disclosure.

Referring to FIG. 19, a method 200 of assembling a hybrid module 28 into a transmission module 26 starts with positioning the tooling system 50 relative to the hybrid module 28 in step 202. When the alignment pins 100 are inserted into corresponding positioning holes in the hybrid module 28, the input shaft 38 of the hybrid module 28 is aligned with a center of the gripper 56 along the assembly axis X and the nozzle 78 of the clutch actuator 58 is aligned with the side opening 82 of the hybrid module 28.

Next, the gripper 56 is moved to a closed position to grip the input shaft 38 of the hybrid module 28 in step 204. Then, the tooling system 50 and the hybrid module 28 are moved by the robotic arm 62 to a position above the transmission module 26 such that hybrid module 28 is aligned with the transmission module 26 along the assembly line X in step 206. Then, the clutch actuator 58 is actuated to cause the clutch 32 inside the hybrid module 28 to engage in step 208. This is achieved by moving the nozzle 78 from a retracted position to an extended position, moving the probiscis 80 inside the nozzle 78 forward to sealing contact with the port 84 inside the hybrid module 28, and then applying fluid pressure (e.g., air or hydraulic pressure) to the port 84 which is in fluid communication with the clutch 32. As an example, air pressure may be used at approximately 60 psi. When the clutch 32 is engaged, the output shaft 40 of the hybrid module 28 cannot freely rotate relative to the input shaft 38 of the hybrid module 28. The hybrid module 28 is now able to be decked and installed to the partially built transmission module 26.

Then, the hybrid module 28 is lowered to a predetermined position adjacent to the transmission module 26 in step 210. The predetermined position may be a position where the end of the output shaft 40 of the hybrid module 28 is in contact with an end of the input shaft 42 of the transmission module 26. During installation, the input shaft 42 of the transmission module 26 is rotating to ensure proper gear mesh engagements between the hybrid module 28 and the transmission module 26 as well as the various components in the transmission module 26 during the installation. Because the alignment pins 100 are axially biased toward the housing 31 of the hybrid module 28, the springs provide damping for the hybrid module 28 during installation to reduce the impact between the hybrid module 28 and the transmission module 26. In addition, the linear actuators 73 disposed between the base support 70 and the upper support 72 also provide damping for the hybrid module 28 by allowing the pistons to freely move in the cylinders in response to the resistance to axially translating the hybrid module 28 toward the transmission module 26.

Thereafter, the tooling system 50 performs a seating operation including axially translating the hybrid module 28 toward the transmission module 26 and clocking the input shaft 38 relative to the hybrid module housing 31 to engage a plurality of meshing engagements between the hybrid module 28 and the transmission module 26 until the housing 31 of the hybrid module 28 seats on the housing 30 of the transmission module 26 in step 212.

The tooling system 50 may use a force sensor, e.g., the force control device 120, to monitor resistance to axially translating the hybrid module 28 toward the transmission module 26 and the distance between the hybrid module 28 and the transmission module 26. The force sensor 120 is configured to detect resistance to linearly translating the hybrid module 28 axially toward the housing 30 of the transmission module 26. When output shaft 40 of the hybrid module 28 is misaligned with input shaft 42 of the transmission module 26, the output shaft 40 of the hybrid module 28 cannot properly engage the input shaft 42 of the transmission module 26 and the force sensor 120 detects a relatively high resistance to linearly translating the hybrid module 28 toward the transmission module 26. In contrast, when the output shaft 40 of the hybrid module 28 is rotated to a desired rotational position relative to the input shaft 42 of the transmission module 26, the force sensor 120 detects a relatively low resistance to linearly translating the hybrid module 28 toward the transmission module 26.

Therefore, clocking the input shaft 38 of the hybrid module 28 includes rotating the input shaft 38 in response to an axial translation force being greater than a threshold force. When the force sensor 120 detects an axial translation force greater than a threshold force, the rotating base 60 continues to rotate the input shaft 38 of the hybrid module 28 to adjust the rotational position of the input shaft 38 and the output shaft 40 of the hybrid module 28. The rotating base 60 is rotated by the rotational actuator 112. When the force sensor 120 detects an axial translation force below a threshold, the rotational actuator 112 stops rotating the rotating base 60 and the robotic arm 62 (or a separate translating device) translates the tooling system 50 toward the transmission module 26 until all engagements between the hybrid module 28 and the transmission module 26 are made in step 214. During translating, the force control device 120 may monitor the final axial position of the hybrid module 28 to determine whether all engagements have been made, including the engagement between the output shaft 40 of the hybrid module 28 and the input shaft 42 of the transmission module 26 and the engagement between the housing 31 of the hybrid module 28 and the housing 30 of the transmission module 26. After installation, the gripper 56 is moved to the retracted position to release the input shaft 38 of the hybrid module 28, the clutch actuator 58 is deactivated to disengage the clutch 32 inside the hybrid module 28, and the tooling system 50 is moved away from the transmission assembly in step 216. The method ends in step 218.

Figure 20:
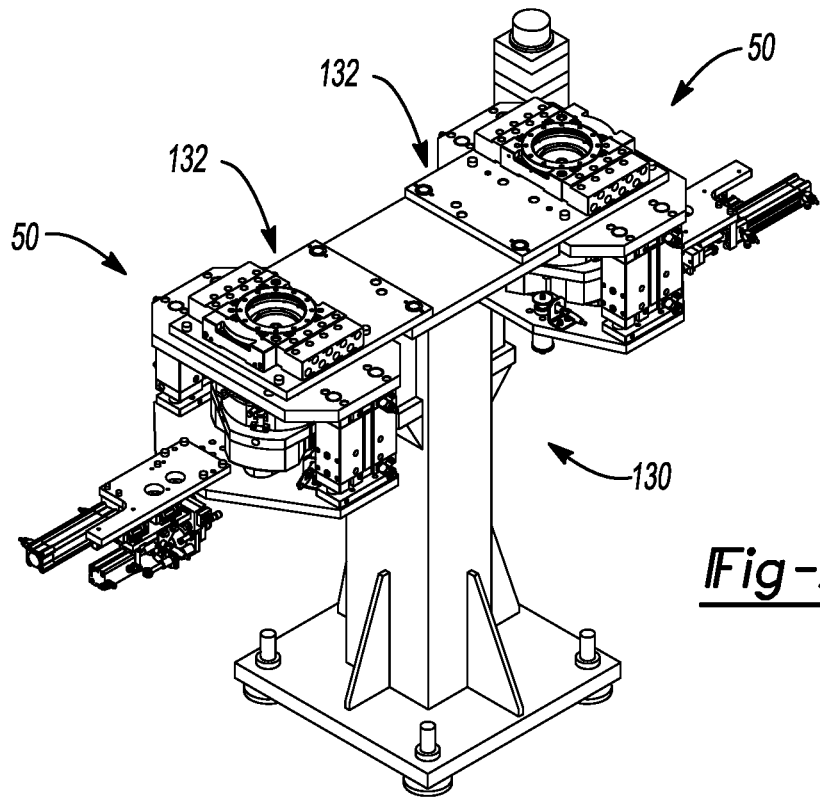
FIG. 20 is a perspective view of a tooling system mounted to a mounting base and constructed in accordance with the teachings of the present disclosure.
Figure 21:
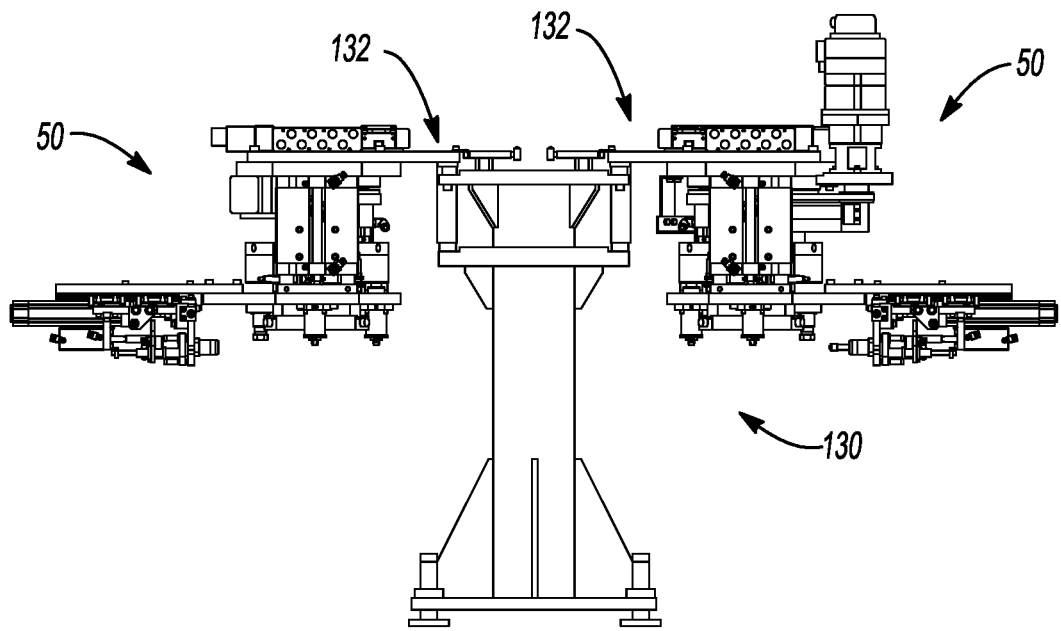
FIG. 21 is a front view of the tooling system and the mounting base of FIG. 20.

Referring to FIGS. 20 and 21, in another form, the tooling system 50 may be mounted to a mounting base 130 that is fixed to the ground. One or two tooling systems 50 may be mounted to overhead mounting arms 132 of the mounting base 130. By rotating the mounting arms 132, the tooling system 50 can be moved from a first location to grip the hybrid module to a second location to install the hybrid module to a transmission module. Instead of using a robotic arm, a separate translating device may be incorporated into the tooling system 50 to lower and lift the hybrid module 28 and/or the transmission module 26 in a vertical direction.

Alternatively, the tooling system 50 may be mounted to an overhead beam without using a mounting base.

The tooling system constructed in accordance with the teachings of the present disclosure can install a hybrid module into a transmission system in a vertical orientation on a high volume assembly line, particularly within 18-20 seconds part to part cycle time. During installation, the input/output shaft of the hybrid module and the input shaft of the transmission module are rotating to ensure proper engagement between the output shaft of the hybrid module and the input shaft of the transmission module. Therefore, the tooling system has the advantage of reducing assembly time, thereby reducing manufacturing costs.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tooling system for assembling a hybrid vehicle transmission assembly that includes a hybrid module and a transmission module, the tooling system comprising:
a positioning device configured to position the hybrid module relative to a transmission housing of the transmission module;
a support structure;
a gripper supported by the support structure and configured to grip an input shaft of the hybrid module;
a clutch actuator configured to actuate a clutch of the hybrid module;
a rotational actuator drivingly coupled to the gripper and configured to rotate the gripper about an assembly axis; and
a controller in communication with the positioning device, the gripper, the clutch actuator, and the rotational actuator, the controller being configured to control operation of the clutch actuator, the positioning device, the gripper, and the rotational actuator such that an operation is performed that includes the clutch actuator actuating the clutch to engage, the gripper gripping the input shaft of the hybrid module, the rotational actuator rotating the gripper to rotate the input shaft of the hybrid module relative to an input shaft of the transmission module, and the positioning device translating the hybrid module toward the transmission module to seat a housing of the hybrid module on the transmission housing.

2. The tooling system according to claim 1, wherein the controller is configured to control the positioning device to align the hybrid module with the transmission housing along the assembly axis and to control a translational device to translate a housing of the hybrid module toward the transmission module.

3. The tooling system according to claim 1 further comprising a plurality of alignment pins coupled to the support structure, each alignment pin configured to engage a mating feature on the hybrid module to align the hybrid module with the gripper.

4. The tooling system according to claim 3 further comprising a plurality of springs configured to bias the alignment pins axially relative to the support structure toward the housing of the hybrid module.

5. The tooling system according to claim 1, wherein the clutch actuator is coupled to the support structure.

6. The tooling system according to claim 5, wherein the clutch actuator includes a first linear actuator and a nozzle coupled to the first linear actuator, the nozzle configured to sealingly engage a port in fluid communication with the clutch of the hybrid module, the first linear actuator configured to move the nozzle relative to the support structure.

7. The tooling system according to claim 6, wherein the nozzle includes a nose piece, a probiscis, and a second linear actuator, the nose piece being disposed about the probiscis, the second linear actuator configured to move the probiscis between an extended position and a retracted position relative to the nose piece, the probiscis configured to sealingly engage the port.

8. The tooling system according to claim 1, wherein the tooling system includes a rotating base supported by the support structure and rotatable relative thereto about the assembly axis, the gripper being supported by the rotating base for rotation therewith about the assembly axis, the rotational actuator being drivingly coupled to the rotating base to rotate the rotating base.

9. The tooling system according to claim 8, wherein the rotational actuator includes a linear actuator supported by the support structure, the linear actuator including a rod configured to translate linearly, the rod coupled to the rotating base such that linear translation of the rod rotates the rotating base.

10. The tooling system according to claim 8, wherein the rotational actuator includes a motor coupled to the support structure, an output of the motor being drivingly coupled to the rotating base to rotate the gripper via the rotating base.

11. The tooling system according to claim 8, wherein the controller is configured to operate the rotational actuator to rotate the gripper via the rotating base while the hybrid module is translated toward the transmission module until an output shaft of the hybrid module engages an input shaft of the transmission module and the housing of the hybrid module is seated on the housing of the transmission module.

12. The tooling system according to claim 1, further comprising a force sensor configured to detect resistance to axially translation of the hybrid module toward the transmission module, wherein the controller is configured to operate the rotational actuator to rotate the input shaft of the hybrid module in response to the force sensor detecting a force exceeding a threshold force.

13. The tooling system according to claim 1 further comprising a grip sensor supported by the support structure and configured to detect a presence of the input shaft of the hybrid module in the gripper.

14. The tooling system according to claim 1, wherein the positioning device includes a robotic arm.

15. A tooling system for assembling a hybrid vehicle transmission assembly that includes a hybrid module and a transmission module, the tooling system comprising:
a positioning device configured to position the hybrid module relative to a transmission housing of the transmission module;
a support structure;
a gripper supported by the support structure and configured to grip an input shaft of the hybrid module;
a clutch actuator configured to actuate a clutch of the hybrid module;
a rotational actuator drivingly coupled to the gripper and configured to rotate the gripper about an assembly axis;
a force sensor configured to detect resistance to axially translation of the hybrid module toward the transmission module; and
a controller in communication with the positioning device, the gripper, the clutch actuator, the rotational actuator, and the force sensor, the controller being configured to control operation of the clutch actuator, the positioning device, the gripper, and the rotational actuator such that an operation is performed that includes the clutch actuator actuating the clutch to engage, the gripper gripping the input shaft of the hybrid module, the rotational actuator rotating the gripper to rotate the input shaft of the hybrid module relative to an input shaft of the transmission module, and the positioning device translating the hybrid module toward the transmission module to seat a housing of the hybrid module on the transmission housing,
wherein the controller is configured to operate the rotational actuator to rotate the input shaft of the hybrid module in response to the force sensor detecting a force exceeding a threshold force.

16. The tooling system according to claim 15, wherein the clutch actuator includes a first linear actuator and a nozzle coupled to the first linear actuator, the nozzle configured to sealingly engage a port in fluid communication with the clutch of the hybrid module, the first linear actuator configured to move the nozzle relative to the support structure.

17. The tooling system according to claim 16, wherein the nozzle includes a nose piece, a probiscis, and a second linear actuator, the nose piece being disposed about the probiscis, the second linear actuator configured to move the probiscis between an extended position and a retracted position relative to the nose piece, the probiscis configured to sealingly engage the port.

18. The tooling system according to claim 15, wherein the tooling system includes a rotating base supported by the support structure and rotatable relative thereto about the assembly axis, the gripper being supported by the rotating base for rotation therewith about the assembly axis, the rotational actuator being drivingly coupled to the rotating base to rotate the rotating base, wherein the rotational actuator includes a linear actuator supported by the support structure, the linear actuator including a rod configured to translate linearly, the rod coupled to the rotating base such that linear translation of the rod rotates the rotating base.

19. The tooling system according to claim 15, wherein the tooling system includes a rotating base supported by the support structure and rotatable relative thereto about the assembly axis, the gripper being supported by the rotating base for rotation therewith about the assembly axis, the rotational actuator being drivingly coupled to the rotating base to rotate the rotating base, wherein the rotational actuator includes a motor coupled to the support structure, an output of the motor being drivingly coupled to the rotating base to rotate the gripper via the rotating base.

20. A method of operating the tooling system according to claim 1 to assemble a hybrid vehicle transmission assembly, the method comprising:
providing a hybrid module of the hybrid vehicle transmission assembly, the hybrid module including a hybrid module housing, a torque converter, a motor, a clutch, and an input shaft;
operating the positioning device to align the hybrid module coaxially with a transmission of the hybrid vehicle transmission assembly;
gripping the input shaft with the gripper;

operating the clutch actuator to actuate the clutch to lock the torque converter; and performing a seating operation including operating the positioning device to axially translate the hybrid module toward the transmission and operating the rotational actuator to clock the input shaft relative to the hybrid module housing to engage a plurality of meshing engagements between the hybrid module and the transmission until the hybrid module housing seats on a transmission housing of the transmission.

\* \* \* \* \*